US012688411B1

(12) United States Patent
Geifman et al.

(10) Patent No.: US 12,688,411 B1
(45) Date of Patent: Jul. 21, 2026

(54) SYSTEM AND METHOD FOR RUNTIME OPTIMIZATION OF NEURAL NETWORKS

(71) Applicant: NVIDIA Corporation, Santa Clara, CA (US)

(72) Inventors: Yonatan Geifman, Bazra (IL); Ran El-Yaniv, Haifa (IL)

(73) Assignee: NVIDIA Corporation, Santa Clara, CA (US)

( * ) Notice: Subject to any disclaimer, the term of this patent is extended or adjusted under 35 U.S.C. 154(b) by 1065 days.

(21) Appl. No.: 17/694,654

(22) Filed: Mar. 14, 2022

Related U.S. Application Data

(60) Provisional application No. 63/161,132, filed on Mar. 15, 2021.

(51) Int. Cl.
*G06N 3/08* (2023.01)
*G06N 3/04* (2023.01)

(52) U.S. Cl.
CPC ................ *G06N 3/08* (2013.01); *G06N 3/04* (2013.01)

(58) Field of Classification Search
None
See application file for complete search history.

(56) References Cited

PUBLICATIONS

Chen, An-Chieh et al.; "Searching Toward Pareto-Optimal Device-Aware Neural Architectures"; 2018; ACM; 1-7 (Year: 2018).*

StackOverflow forum post entitled "Tensorflow—Inference time evaluation" [online]; 3 pages; first posted on Jan. 25, 2018 by user "Polups"; Retrieved from Internet <https://stackoverflow.com/questions/48438245/tensorflow-inference-time-evaluation> (Year: 2018).*

Lu, Zhichao et al.; "NSGA-Net: Neural Architecture Search using Multi-Objective Genetic Algorithm"; 2019; ACM Proceedins of the Genetic and Evolutionary Computation Conference 2019; 419-427 (Year: 2019).*

Liu, Chenxi et al.; "Progressive Neural Architecture Search"; Jul. 2018; arXiv; 1-20 (Year: 2019).*

Geifman, Yonatan et al.; "Deep Active Learning with a Neural Architecture Search"; 2019; NeurIPS 2019; 1-11 (Year: 2019).*

Bulat, Adrian et al.; "BATS: Binary Architecture Search"; 2020; Springer ECCV 2020; 309-325 (Year: 2020).*

(Continued)

*Primary Examiner* — David Yi
*Assistant Examiner* — Ezra J Baker
(74) *Attorney, Agent, or Firm* — The Roy Gross Law Firm, LLC; Roy D. Gross

(57) ABSTRACT

Systems and methods of optimizing runtime of a neural network (NN) by at least one processor may include: receiving a space of untrained NN architectures, capable of performing a predefined NN function on a given computing device, after being trained; receiving a reference accuracy metric value; evaluating a latency value for each NN architecture of the architecture space; dividing the architecture space to a plurality of groups based on said evaluated latency; performing a search among the plurality of groups, to determine a group G* that corresponds to a minimal evaluated latency, and yet comprises at least one NN architecture that maintains an accuracy metric value that is at least equal to the reference accuracy metric value; and training at least one NN architecture of the determined group G* to perform the NN function.

21 Claims, 8 Drawing Sheets

(56)          References Cited

PUBLICATIONS

Syed, Muhtadyuzzaman et al.; "Generalized Latency Performance Estimation for Once-for-All Neural Architecture Search"; Jan. 2021; arXiv; 1-12 (Year: 2021).*

Lomurno, Eugenio et al.; "Pareto-Optimal Progressive Neural Architecture Search"; Jul. 2021; ACM GECCO '21 Companion; 1726-1734 (Year: 2021).*

Salinas, David; "A Multi-Objective Perspective on Jointly Tuning Hardware and Hyperparameters"; Jun. 2021; arXiv; 1-9 (Year: 2021).*

Lee, Hayeon et al.; "HELP: Hardware-Adaptive Efficient Latency Prediction for NAS via Meta-Learning"; Dec. 2021; arXiv; 1-22 (Year: 2021).*

PL Bartlett, N Harvey, C Liaw, and A Mehrabian. Nearly-tight vcdimension and pseudodimension bounds for piecewise linear neural networks. J. Mach. Learn. Res., 20:63-1, 2019. Available online: [https://jmlr.org/papers/volume20/17-612/17-612.pdf].

A. Blumer, A. Ehrenfeucht, D. Haussler, and M. K. Warmuth. 1989. Learnability and the Vapnik-Chervonenkis dimension. J. ACM 36, 4 (Oct. 1989), 929-965. https://doi.org/10.1145/76359.76371.

RDarius Buhai, Y Halpern, Y Kim, A Risteski, and D Sontag. Empirical study of the benefits of overparameterization in learning latent variable models. arXiv preprint arXiv:1907.00030, 2019.

J. Deng, W. Dong, R. Socher, L.-J. Li, Kai Li and Li Fei-Fei, "ImageNet: A large-scale hierarchical image database," 2009 IEEE Conference on Computer Vision and Pattern Recognition, Miami, FL, USA, 2009, pp. 248-255, doi: 10.1109/CVPR.2009.5206848.

J Devlin, M-W Chang, K Lee, and K Toutanova. Bert: Pre-training of deep bidirectional transformers for language understanding. arXiv preprint arXiv:1810.04805, 2018.

Gonzalez, T.F. (1985). Clustering to Minimize the Maximum Intercluster Distance. Theor. Comput. Sci., 38, 293-306. DOI: 10.1016/0304-3975(85)90224-5.

RM Haralick and LG Shapiro. Image segmentation techniques. Computer vision, graphics, and image processing, 29 (1):100-132, 1985. https://doi.org/10.1016/S0734-189X(85)90153-7.

K. He, X. Zhang, S. Ren and J. Sun, "Deep Residual Learning for Image Recognition," 2016 IEEE Conference on Computer Vision and Pattern Recognition (CVPR), Las Vegas, NV, USA, 2016, pp. 770-778, doi: 10.1109/CVPR.2016.90.

Krizhevsky, A., Sutskever, I., & Hinton, G.E. (2012). ImageNet classification with deep convolutional neural networks. Communications of the ACM, 60, 84-90. DOI:10.1145/3065386.

DS Hochba. 1997. Approximation Algorithms for NP-Hard Problems. SIGACT News 28, 2 (Jun. 1997), 40-52. https://doi.org/10.1145/261342.571216.

Gao Huang, Zhuang Liu, Laurens Van Der Maaten, and Kilian QWeinberger. Densely connected convolutional networks. In Proceedings of the IEEE conference on computer vision and pattern recognition, pp. 4700-4708, 2017.

Joachims, T. (1998). Text categorization with Support Vector Machines: Learning with many relevant features. In: Nedellec, C., Rouveirol, C. (eds) Machine Learning: ECML-98. ECML 1998. Lecture Notes in Computer Science, vol. 1398. Springer, Berlin, Heidelberg. https://doi.org/10.1007/BFb0026683.

B. H. Juang; L. R. Rabiner. Hidden Markov Models for Speech Recognition. Technometrics, vol. 33, No. 3. (Aug., 1991), pp. 251-272. https://doi.org/10.2307/1268779.

J Redmon, S Divvala, R Girshick, and A Farhadi. You only look once: Unified, real-time object detection. In Proceedings of the IEEE conference on computer vision and pattern recognition, pp. 779-788, 2016. DOI: 10.1109/CVPR.2016.91.

K Simonyan and A Zisserman. Very deep convolutional networks for large-scale image recognition. arXiv preprint arXiv:1409.1556, 2014.

Vladimir Vapnik. The nature of statistical learning theory. Springer science & business media, 2000.

Wang, C., Li, M., & Smola, A. J. (2019). Language models with transformers. arXiv preprint arXiv:1904.09408.

Wang, X., Zhang, R., Kong, T., Li, L., & Shen, C. (2020). SOLOv2: Dynamic and Fast Instance Segmentation. arXiv: Computer Vision and Pattern Recognition.

* cited by examiner

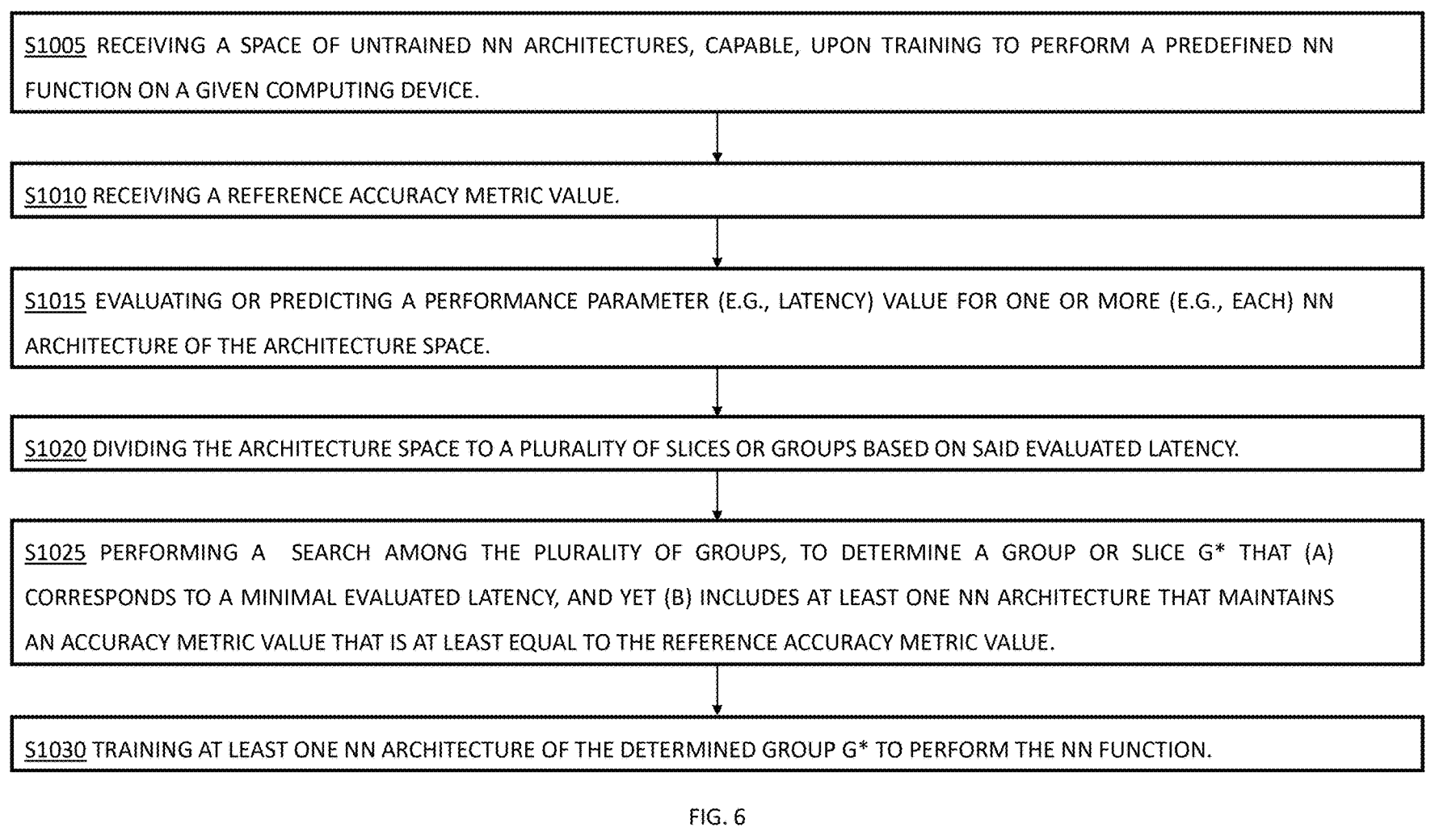

S1005 RECEIVING A SPACE OF UNTRAINED NN ARCHITECTURES, CAPABLE, UPON TRAINING TO PERFORM A PREDEFINED NN FUNCTION ON A GIVEN COMPUTING DEVICE.

S1010 RECEIVING A REFERENCE ACCURACY METRIC VALUE.

S1015 EVALUATING OR PREDICTING A PERFORMANCE PARAMETER (E.G., LATENCY) VALUE FOR ONE OR MORE (E.G., EACH) NN ARCHITECTURE OF THE ARCHITECTURE SPACE.

S1020 DIVIDING THE ARCHITECTURE SPACE TO A PLURALITY OF SLICES OR GROUPS BASED ON SAID EVALUATED LATENCY.

S1025 PERFORMING A SEARCH AMONG THE PLURALITY OF GROUPS, TO DETERMINE A GROUP OR SLICE G* THAT (A) CORRESPONDS TO A MINIMAL EVALUATED LATENCY, AND YET (B) INCLUDES AT LEAST ONE NN ARCHITECTURE THAT MAINTAINS AN ACCURACY METRIC VALUE THAT IS AT LEAST EQUAL TO THE REFERENCE ACCURACY METRIC VALUE.

S1030 TRAINING AT LEAST ONE NN ARCHITECTURE OF THE DETERMINED GROUP G* TO PERFORM THE NN FUNCTION.

FIG. 6

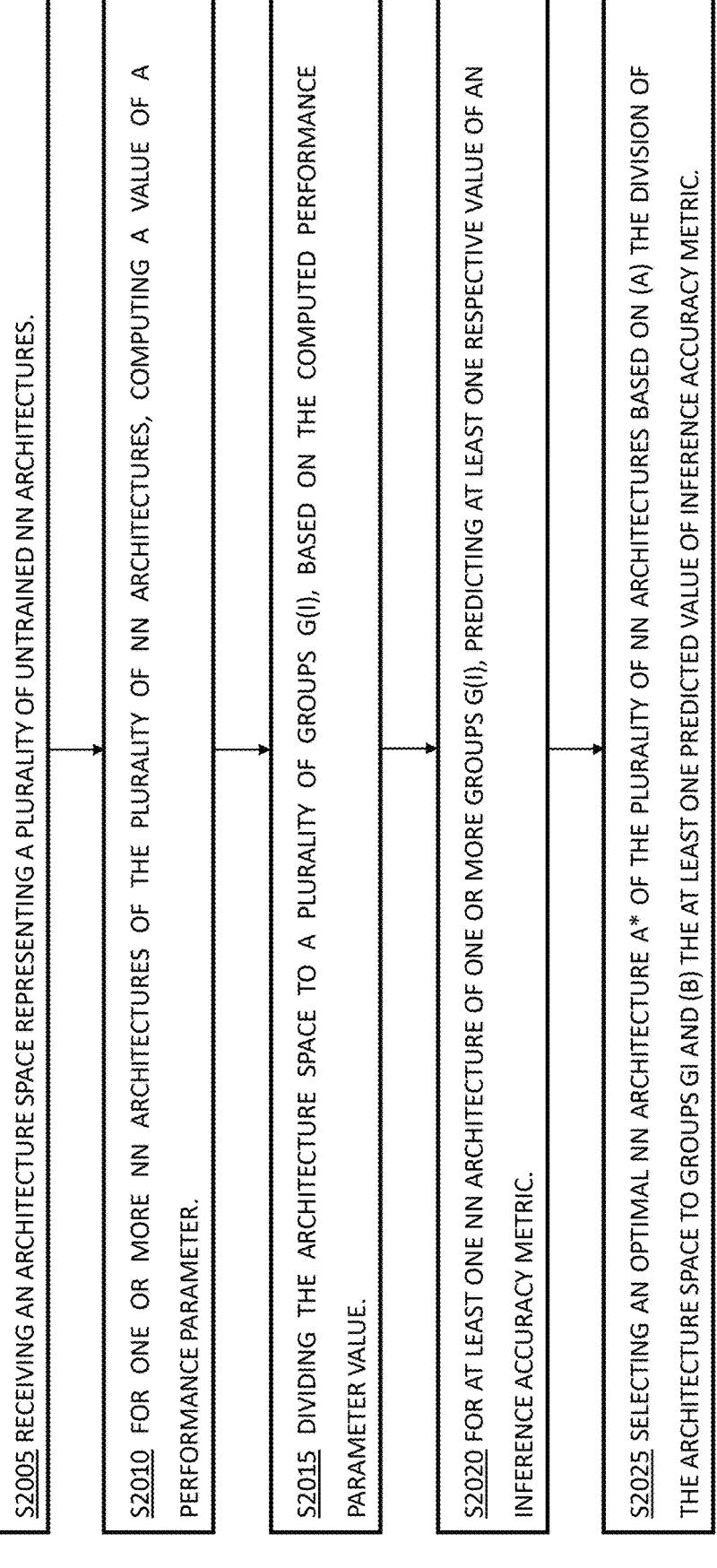

S2005 RECEIVING AN ARCHITECTURE SPACE REPRESENTING A PLURALITY OF UNTRAINED NN ARCHITECTURES.

S2010 FOR ONE OR MORE NN ARCHITECTURES OF THE PLURALITY OF NN ARCHITECTURES, COMPUTING A VALUE OF A PERFORMANCE PARAMETER.

S2015 DIVIDING THE ARCHITECTURE SPACE TO A PLURALITY OF GROUPS G(I), BASED ON THE COMPUTED PERFORMANCE PARAMETER VALUE.

S2020 FOR AT LEAST ONE NN ARCHITECTURE OF ONE OR MORE GROUPS G(I), PREDICTING AT LEAST ONE RESPECTIVE VALUE OF AN INFERENCE ACCURACY METRIC.

S2025 SELECTING AN OPTIMAL NN ARCHITECTURE A* OF THE PLURALITY OF NN ARCHITECTURES BASED ON (A) THE DIVISION OF THE ARCHITECTURE SPACE TO GROUPS GI AND (B) THE AT LEAST ONE PREDICTED VALUE OF INFERENCE ACCURACY METRIC.

FIG. 7

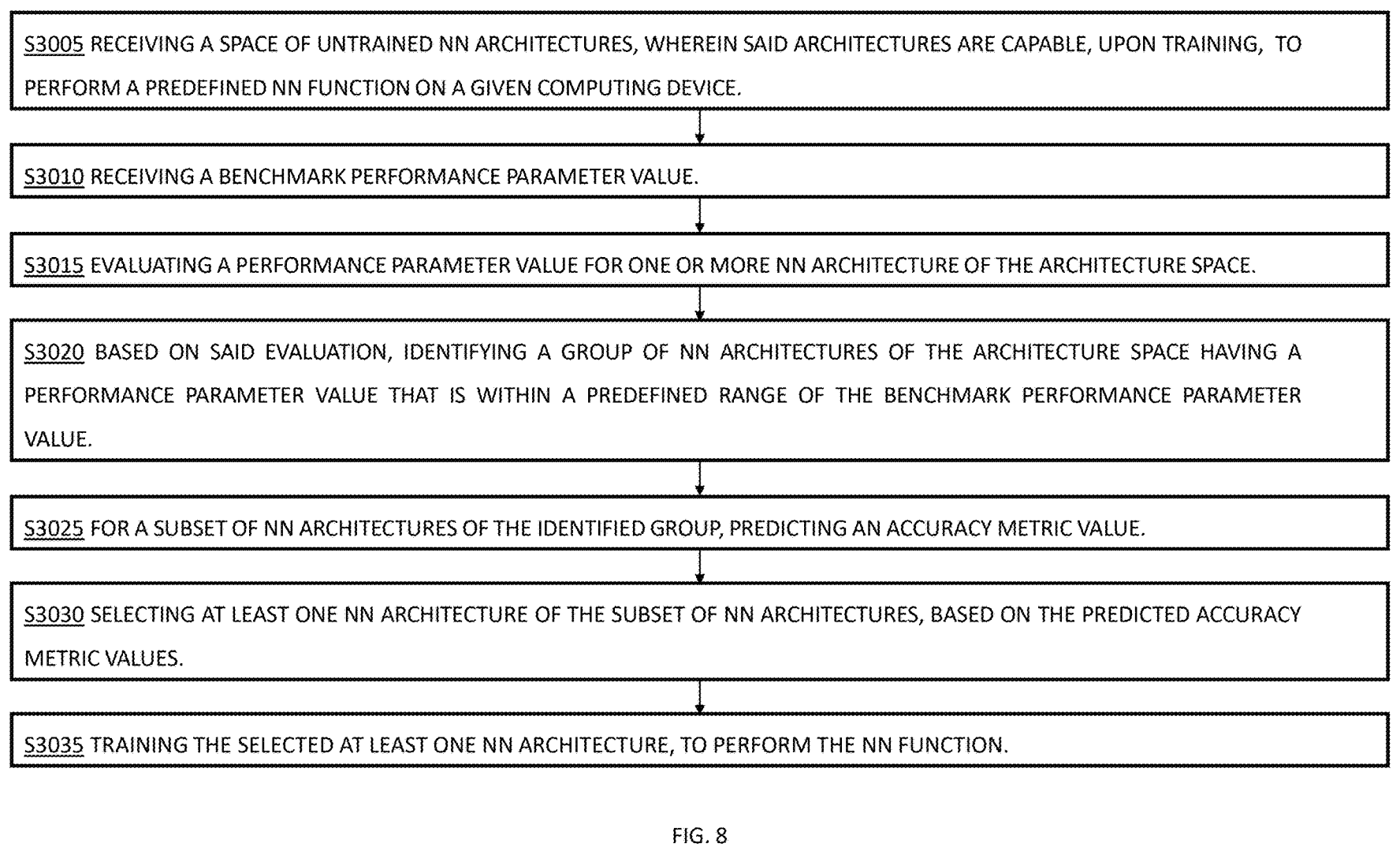

S3005 RECEIVING A SPACE OF UNTRAINED NN ARCHITECTURES, WHEREIN SAID ARCHITECTURES ARE CAPABLE, UPON TRAINING, TO PERFORM A PREDEFINED NN FUNCTION ON A GIVEN COMPUTING DEVICE.

S3010 RECEIVING A BENCHMARK PERFORMANCE PARAMETER VALUE.

S3015 EVALUATING A PERFORMANCE PARAMETER VALUE FOR ONE OR MORE NN ARCHITECTURE OF THE ARCHITECTURE SPACE.

S3020 BASED ON SAID EVALUATION, IDENTIFYING A GROUP OF NN ARCHITECTURES OF THE ARCHITECTURE SPACE HAVING A PERFORMANCE PARAMETER VALUE THAT IS WITHIN A PREDEFINED RANGE OF THE BENCHMARK PERFORMANCE PARAMETER VALUE.

S3025 FOR A SUBSET OF NN ARCHITECTURES OF THE IDENTIFIED GROUP, PREDICTING AN ACCURACY METRIC VALUE.

S3030 SELECTING AT LEAST ONE NN ARCHITECTURE OF THE SUBSET OF NN ARCHITECTURES, BASED ON THE PREDICTED ACCURACY METRIC VALUES.

S3035 TRAINING THE SELECTED AT LEAST ONE NN ARCHITECTURE, TO PERFORM THE NN FUNCTION.

FIG. 8

SYSTEM AND METHOD FOR RUNTIME OPTIMIZATION OF NEURAL NETWORKS

CROSS REFERENCE TO RELATED APPLICATIONS

This application claims the benefit of priority under 35 U.S.C. § 119(e) of U.S. Provisional Patent Application No. 63/161,132, filed Mar. 15, 2022. The contents of the above application is incorporated by reference as if fully set forth herein in its entirety.

FIELD OF THE INVENTION

The present invention relates generally to the field of Neural Networks (NN). More specifically, the present invention relates to optimization of inference of NNs.

BACKGROUND OF THE INVENTION

As the integration of NN based algorithms into modern applications becomes ubiquitous, there is an ever growing need to facilitate execution of NN based algorithms, at an ever-increasing speed.

Execution of NN models, including for example, training and inference of machine learning (ML) or deep learning (DL) models, may rely on the underlying hardware and/or software frameworks. Therefore, currently available systems may implement a first approach for increasing performance of NN based algorithms by executing such algorithms on powerful, customary processing machines, such as graphical processing units (GPUs) that may distribute the underlying computation over a large number of computing cores.

Another approach for accelerating execution of NN based applications may include decreasing the number of computations by compressing the NN model. Such solutions may include pruning of at least one portion of a NN or quantizing the numerical representation of elements of the NN model. Such methods may substantially accelerate inference time, but often compromise the accuracy of the NN model.

SUMMARY OF THE INVENTION

Another approach for accelerating execution of NN based applications may include a process that is commonly referred to in the art as Neural Architecture Search (NAS). The NAS process may include searching for an appropriate NN configuration within a space of allowable NN architectures. As known in the art, NAS-based NN search may show promising results for obtaining efficient NN architectures, but the process of arriving at a selected architecture may be extremely or even forbiddingly computationally intensive. Additionally, currently available NAS-based NN search algorithms may be prone to fall into local solutions, and may not generate global, optimal solutions for NN architecture search problems.

Embodiments of the invention may be adapted to receive (e.g., from a user) an original, or reference NN model, pretrained to perform a specific NN function. This reference model may be referred to herein as NN model M0. For example, NN model M0 may be a convolutional neural network (CNN), adapted to perform an image analysis function or task such as an object detection function, on incoming images.

Alternatively, embodiments of the invention may receive or obtain metrics pertaining to NN model M0, rather than receiving NN model M0 itself. For example, embodiments of the invention may receive or obtain one or more metrics of performance, including for example latency and/or throughput of execution or inference of M0 on a given computing device and/or dataset. Additionally, embodiments of the invention may receive or obtain one or more metrics of accuracy of NN model M0, as elaborated herein.

Embodiments of the invention may also receive a plurality of untrained NN architectures, which may be adapted to perform the same task as NN model M0 on a given computing device, after being trained to do so. The term "architecture" may be used in this context to refer to a structure of an untrained or partially trained NN model that may include, for example a number and size of layers, a number and size of kernels, the extent of connectivity among neural nodes, and the like. The term "architecture" may differ from the term "model" by referring to a neural network that has not necessarily been trained yet, or is only partially trained to perform a NN based function or task, whereas the term "model" may refer to a NN structure that is already trained to perform the underlying task.

The received plurality of NN architectures may be referred to herein as an "architecture space" or "search space", and these terms may be used interchangeably. An "architecture space" or "search space" may include a diversified representation of NN architectures, which, subject to training, may perform the NN function or task on the given computing device. The search space may include a selection of architectures that may be either exhaustive, or non-exhaustive, in relation to one or more NN parameters.

Pertaining to the example of CNN networks, the architecture space may include an exhaustive selection of a number of convolutional layers within a predefined range (e.g., 1 layer, 2 layers, etc., up to 10 layers). In another example, the architecture space may include a non-exhaustive selection of layer sizes (e.g., the number of neurons) in each layer.

It may be appreciated that the number of architectures that may be included in the architecture space may be very large, e.g., in an order larger than thousands (e.g., hundreds of thousands, or even millions). Nevertheless, even architecture spaces in the order of thousands of architectures may render infeasible the selection of architectures based on individual NN model training.

As elaborated herein, embodiments of the invention may perform an efficient global NN search algorithm, to select at least one NN architecture of the architecture space, based on the performance metrics and/or accuracy metrics of the reference NN model M0. The term "global" may be used in this context to indicate a complete search, that is not confined to a subset of the architecture space, and may provide a globally optimal selection of at least one NN architecture from the received architecture space.

Embodiments of the invention may include a method of optimizing runtime of a NN by at least one processor. Embodiments of the method may include receiving a space of untrained NN architectures, configured to, or capable of performing a predefined NN function on a given computing device, after being trained. Pertaining to the example of CNNs for image analysis, the space of untrained NN architectures may include a plurality of CNNs, which differ in at least one hyperparameter (e.g., the number of layers), where each of the NN architectures may be trained (e.g., by supervised or unsupervised training, as known in the art) to perform the underlying task of image analysis.

Embodiments of the method may further include receiving a reference accuracy metric value; evaluating a latency value for each NN architecture of the architecture space; dividing the architecture space to a plurality of groups based on said evaluated latency; performing a search among the plurality of groups, to determine a group G* that (a) corresponds to a minimal evaluated latency, and (b) includes at least one NN architecture that maintains an accuracy metric value that is at least equal to the reference accuracy metric value; and training at least one NN architecture of the determined group G* to perform the NN function.

Embodiments of the method may further include estimating an accuracy metric value of NN architectures within the determined group G*; training a predefined $K_1$ number of NN architectures of the determined group G*, corresponding the top-ranking or top-valued estimated or predicted accuracy values; measuring an accuracy metric value of the $K_1$ trained NN architectures; and selecting the NN architecture having the highest measured accuracy to perform the predefined NN function.

According to some embodiments of the invention, performing a search among groups of the architecture space may include: (a) performing an iterative multiplication search, among the plurality of groups, to determine a limit group $S_L$; and performing an iterative binary search, among a subset of groups limited by group $S_L$, to determine group G*.

According to some embodiments, each iterative step of the multiplication search may relate to a specific, current group, corresponding to a latency L. Each iterative step may include estimating an accuracy value of NN architectures within the current group; if at least one accuracy value may be at least equal to the reference accuracy value, then moving to a next group that corresponds to latency L/2; and determining the first group which does not comprise a NN architecture that maintains an accuracy metric value that may be at least equal to the reference accuracy metric value as the limit group $S_L$.

According to some embodiments of the invention, each iterative step of the binary search may relate to a specific, current group, corresponding to a latency L. Each iterative step may include estimating an accuracy value of NN architectures within the current group; if at least one accuracy value may be at least equal to the reference accuracy value, then moving to a next group that corresponds to latency L/2; and if no accuracy value may be at least equal to the reference accuracy value, then moving to a next group that corresponds to latency 2L.

According to some embodiments, estimating an accuracy metric value of NN architectures may include employing a capacity prediction function f( ), adapted to compare accuracy of untrained or partially trained NN architectures, such that for each two NN architectures $A_1$ and $A_2$, if an accuracy metric value of $A_1$ is bigger than an accuracy metric value of $A_2$, then $f(A_1)$ is bigger than $f(A_2)$.

According to some embodiments, estimating the accuracy metric values of NN architectures of the current group may be performed iteratively, wherein each iterative step of accuracy estimation employs progressively increasing computation resources of the at least one processor.

According to some embodiments, each iterative step of accuracy metric estimation of the current group may include eliminating a portion of the NN architectures of the current group, according to the estimated accuracy metric values, until a subset $K_2$ of the NN architectures of the current group is obtained. The value of $K_2$ may be set, for example, as a predefined percentage of the NN architectures of the current group. Additionally, or alternatively, the value of $K_2$ may be set as a predefined number of NN architectures in the current group.

According to some embodiments, evaluating a latency value of a NN architecture may include for example, feeding the evaluated NN architecture with random inputs; sampling a number of forward path computations of the untrained architecture on the given computing device; measuring the latency for each forward path computation; and averaging the resulting latencies, to produce an evaluated latency value of the NN architecture.

Additionally, or alternatively, evaluating a latency value of a NN architecture may include utilizing a machine learning (ML) model that may be trained or pretrained to evaluate a latency metric of the NN architecture, based on one or more structural data elements, representing a structure of the NN architecture. In other words, embodiments of the invention may provide one or more structural data elements, representing a structure of the NN architecture as a first input to the ML based model, and may obtain from the ML-based model a predicted evaluation of the NN architecture latency metric based on the first input. Additionally, or alternatively, embodiments of the invention may provide as a second input, one or more computing device parameters, representing characteristics of an inference computing device, to the ML model; and obtain from the ML-based model a predicted evaluation of the NN architecture latency metric based on the first input and the second input.

According to some embodiments, the ML model may be trained by receiving, by the at least one processor, one or more annotated performance data elements, that comprise ground truth information pertaining to at least one performance metric value of a NN architecture; and training the ML model to evaluate or predict performance metric values for incoming NN architectures, based on a training dataset that may include the received labeled performance data elements.

Additionally, or alternatively the ML model may be an active learning model. Thus, training the ML model may include: emitting (e.g., by the ML model), a request to provide annotated performance data elements that correspond to one or more specific NN architecture; receiving, by the at least one processor, one or more annotated performance data elements, according to the request; and training the ML model to evaluate or predict performance metric values for incoming NN architectures, based on a training dataset that may include the at least one requested labeled performance data element.

Embodiments of the invention may include a system for optimizing runtime of a NN. Embodiments of the system may include: a non-transitory memory device, wherein modules of instruction code may be stored, and at least one processor associated with the memory device, and configured to execute the modules of instruction code.

Upon execution of said modules of instruction code, the at least one processor may be configured to: receive a space of untrained NN architectures, capable of performing a predefined NN function on a given computing device, after being trained; receive a reference accuracy metric value; evaluate a latency value for each NN architecture of the architecture space; divide the architecture space to a plurality of groups based on said evaluated latency perform a search among the plurality of groups, to determine a group G* that (a) corresponds to a minimal evaluated latency, and (b) may include at least one NN architecture that maintains an accuracy metric value that may be at least equal to the reference accuracy metric value; and train at least one NN architecture of the determined group G* to perform the NN function.

Embodiments of the invention may include a method of optimizing inference of a neural network by at least one processor.

According to some embodiments, the at least one processor may receive an architecture space representing a plurality of untrained NN architectures; for one or more NN architectures of the plurality of NN architectures, compute a value of a performance parameter; dividing the architecture space to a plurality of groups Gi, based on the computed performance parameter value; for at least one NN architecture of one or more groups Gi, predict at least one respective value of an inference accuracy metric; and select an optimal NN architecture A* of the plurality of NN architectures based on (a) the division of the architecture space to groups Gi and (b) the at least one predicted value of inference accuracy metric. The NN architectures of the architecture space may be: (a) distinguished by at least one structural data element, and (b) defined as being capable of performing a predetermined NN function after training.

According to some embodiments, during a training stage, the at least one processor may train the selected, optimal NN architecture A* to perform the NN function. Subsequently, during an inference stage, the at least one processor may apply or infer optimal NN architecture A*, to perform the NN function on instances of input data samples.

According to some embodiments, the at least one processor may select an optimal NN architecture A* by receiving a benchmark value of an inference accuracy metric; performing a search among the plurality of architecture groups Gi, to determine a group G* that (a) corresponds to an optimal value of the performance parameter, and (b) may include one or more NN architectures that correspond to a predicted inference accuracy metric value that is at least equal to the benchmark value; and selecting at least one NN architecture from group G* as optimal NN architecture A*.

According to some embodiments, the at least one processor may select at least one NN architecture from group G* as optimal NN architecture A* by training a subset of top-ranking NN architectures of group G*, corresponding to top-ranking predicted inference accuracy metric values; inferring the subset of NN architectures of group G* on a dataset may include annotated input samples; measuring the accuracy metric values according to the annotated input samples; and selecting optimal NN architecture A* according to the measured accuracy metric values.

Additionally, or alternatively, the at least one processor may select an optimal NN architecture A* by: receiving a benchmark value of a performance parameter; selecting a group G* that corresponds to the performance parameter benchmark value; and selecting an NN architecture of group G*, corresponding to a top-ranking predicted inference accuracy metric value as the optimal NN architecture A*.

Additionally, or alternatively, the at least one processor may select a top-ranking, or top-valued NN architecture of group G* by: training a subset of top-ranking NN architectures of group G*, corresponding to top-ranking predicted inference accuracy metric values; inferring the subset of NN architectures of group G* on a dataset may include annotated input samples; for each NN architecture of the subset, measuring the accuracy metric value according to the annotated input samples; and selecting the optimal NN architecture A* according to the measured accuracy metric values.

Embodiments of the invention may include a method of optimizing runtime of a neural network by at least one processor. According to some embodiments, the at least one processor may receive a space of untrained NN architectures, said architectures capable, upon training, to perform a predefined NN function on a given computing device; receive a benchmark performance parameter value; evaluate a performance parameter value for one or more NN architecture of the architecture space; based on said evaluation, identify a group of NN architectures of the architecture space having a performance parameter value that is within a predefined range of the benchmark performance parameter value; for a subset of NN architectures of the identified group, predict an accuracy metric value; select at least one NN architecture of the subset of NN architectures, based on the predicted accuracy metric values; and train the selected at least one NN architecture, to perform the NN function.

Embodiments of the invention may include a system for optimizing inference of a NN. Embodiments of the system may include: a non-transitory memory device, where modules of instruction code are stored, and at least one processor associated with the memory device, and configured to execute the modules of instruction code. Upon execution of said modules of instruction code, the at least one processor may be configured to: receive an architecture space representing a plurality of untrained NN architectures; for one or more NN architectures of the plurality of NN architectures, compute a value of a performance parameter; divide the architecture space to a plurality of groups Gi, based on the computed performance parameter value; for at least one NN architecture of one or more groups Gi, predict at least one respective value of an inference accuracy metric; and select an optimal NN architecture A* of the plurality of NN architectures based on (a) the division of the architecture space to groups Gi and (b) the at least one predicted value of inference accuracy metric.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6, is a flow diagram, depicting a method of performing optimization of inference of neural networks, according to some embodiments;

FIG. 7 is a flow diagram, depicting another method of performing optimization of inference of NNs by at least one processor, according to some embodiments; and FIG. 8 is a flow diagram, depicting another method of performing optimization of inference of NNs by at least one processor, according to some embodiments.

Figure 1:
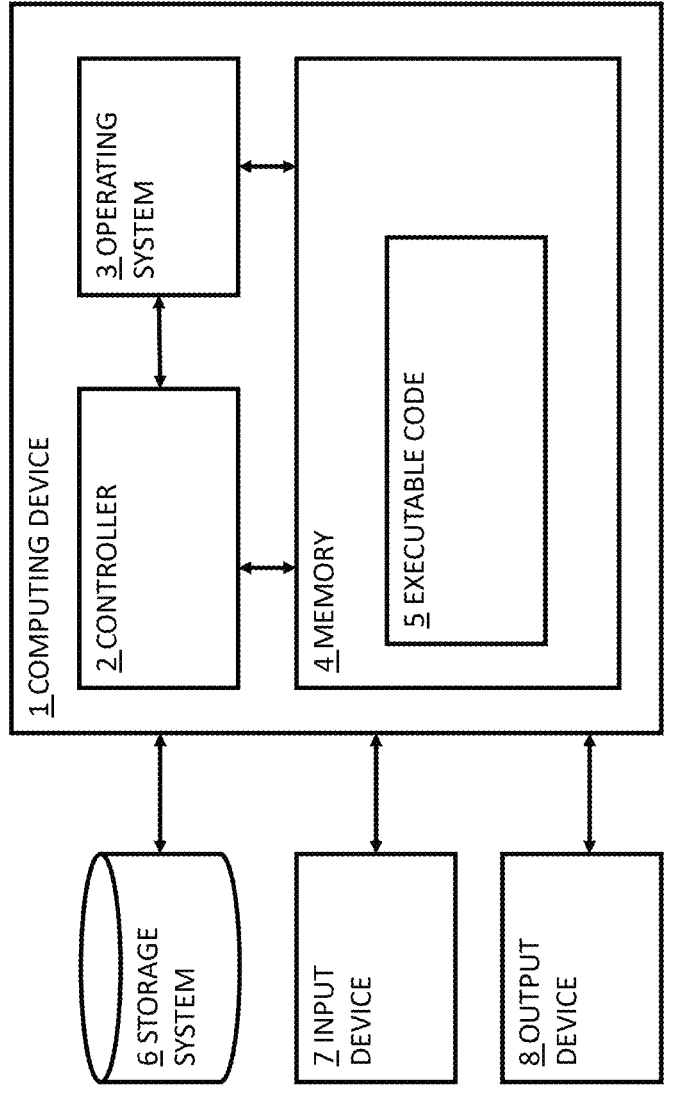
FIG. 1 is a block diagram, depicting a computing device which may be included in a system for optimization of inference of neural networks, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

The following Table 1 includes a list of terms and phrases used throughout this document, alongside respective optional definitions of the terms, for the reader's convenience:

TABLE 1

| | |
|---|---|
| Neural Network (NN), Machine Learning (ML) | A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples or data instances. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations. |
| "ML architecture", "ML model" | The terms "architecture" or "ML architecture" may be used herein to refer to a structure, or a representation of a structure of an untrained, or partially trained NN model. An architecture may include, for example a number and/or size of layers, a number and size of kernels, an extent of connectivity among neural nodes, and the like. The term "architecture" may differ from the term "model": "Architecture" may refer to a NN that has not necessarily been trained yet, or is only partially trained to perform a NN based function or task. The term "model" may refer to a NN structure that is already trained to perform the underlying task. It may be appreciated that during training, an "architecture" may evolve into a "model", and hence these terms may be interchangeable, according to context. |
| Accuracy metric | The term "accuracy metric" may be used herein to refer to any type of metric or measurement that may be used for evaluating accuracy-related performance of an ML model, as known in the art. For example, accuracy metric values may include: ML model accuracy (e.g., a fraction of correct predictions), ML model precision (commonly referred to as "positive predictive value", e.g., a fraction of relevant instances among the retrieved instances), recall (commonly referred to as "sensitivity", e.g., a fraction of relevant instances that were retrieved), ML-model precision-recall tradeoff metrics (e.g., F-measure metrics, squared loss metrics, mean average precision (mAP) metrics, as known in the art), and the like. |
| Performance parameter | The term "performance parameter" may be used herein to refer to any type of parameter that represents a metric of performance of an ML model or architecture, when implemented or executed on a computing device (e.g., during a training and/or inference stage), as known in the art. For example, performance parameter values may include latency of the ML model or architecture, throughput of the ML model or architecture, power consumption of the computing device during execution of the ML model, consumption of computational resources, such as memory footprint (e.g., memory consumption) of the ML model on the computing device and/or processing cycles of the computing device, and the like. |
| Performance Improvement | The term "performance improvement factor" (PIF) may be used herein to refer to any type of factor or parameter that represents improvement of one ML architecture in relation to another ML architecture, in respect to a corresponding performance parameter of interest. |

TABLE 1-continued

| Factor (PIF) | For example, a performance parameter of interest may be latency of execution or application of an ML architecture on an incoming data instance. In this example, a corresponding PIF may be a speed-up factor, indicating improvement of (e.g., how much faster is) a first ML architecture in relation to a second ML architecture. |
|---|---|
| "Architecture space", "search space" | The terms "architecture space" and "search space" may be used herein to indicate a diversified representation of a plurality NN architectures, which, subject to training, may perform a predetermined NN function or task on a given computing device. NN architectures of the architecture space may be characterized as (a) being distinguished by at least one structural data element, and (b) being capable of performing a predetermined NN function subsequent to training. Embodiments of the invention may be configured to optimize performance of an ML function be searching through the search space for an optimal ML architecture A* (an optimal ML model M*) that may perform optimally e.g., in relation to predetermined performance parameters and accuracy metrics. As elaborated herein, embodiments of the invention may train the optimal NN architecture A*, to produce optimal model M*, and to perform the underlying NN function. In other words, during an inference stage, embodiments of the invention may apply optimal NN architecture A* (now optimal model M*), to perform the NN function on incoming instances of input data samples. |

Reference is now made to FIG. 1, which is a block diagram depicting a computing device, which may be included within an embodiment of a system for optimization of inference of neural networks, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may optimize runtime of neural networks as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more neural networks may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse, and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2:
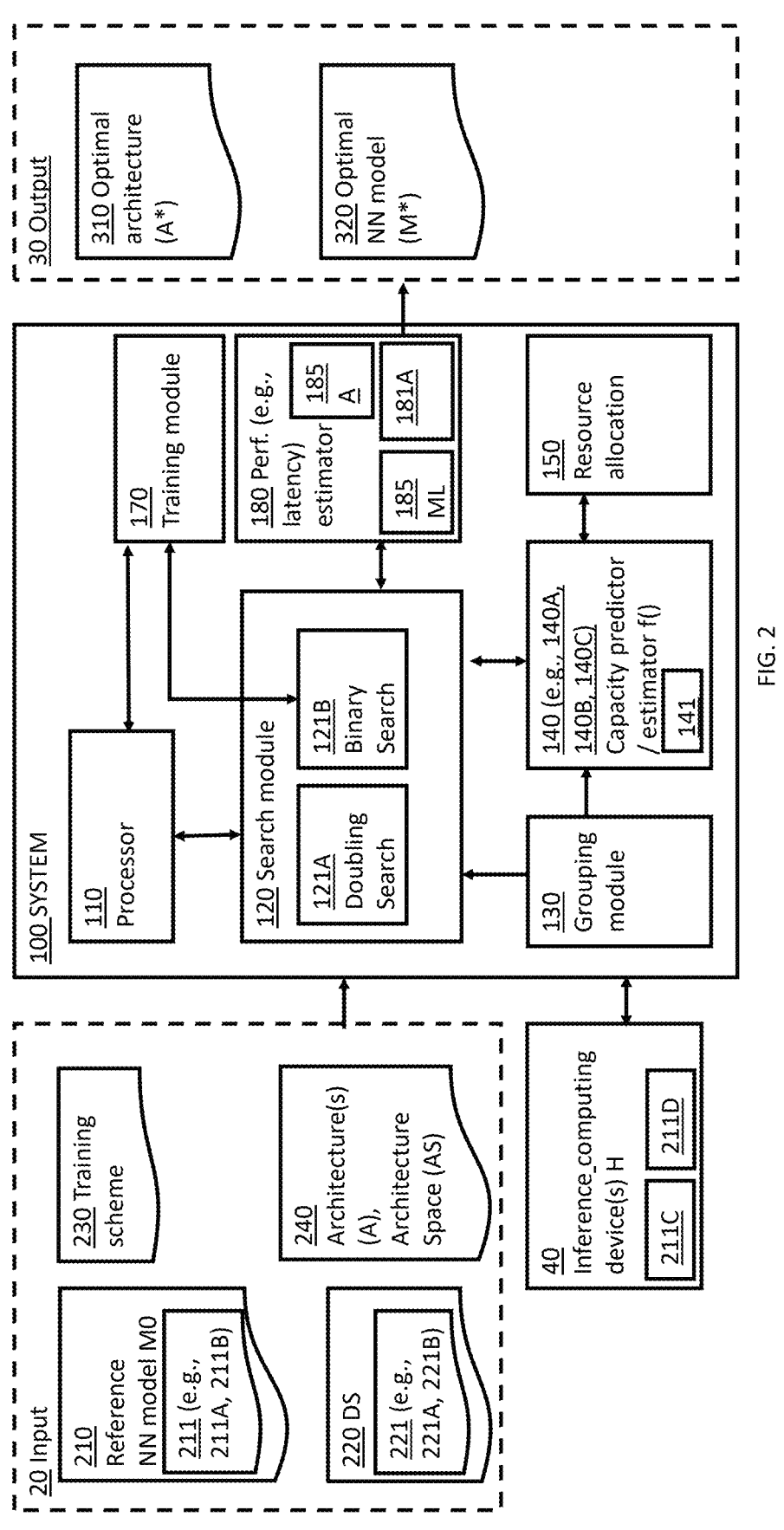
FIG. 2 is a block diagram, depicting a system for optimization of inference of neural networks, according to some embodiments.

Reference is now made to FIG. 2, which depicts a system 100 for performing optimization of inference of neural networks, according to some embodiments. According to some embodiments of the invention, system 100 may be implemented as a software module, a hardware module, or any combination thereof.

For example, system 100 may be or may include a computing device such as element 1 of FIG. 1, and may include a processing unit 110, such as processor 2 of FIG. 1. Processing unit 110 may be adapted to execute one or more modules of executable code (e.g., elements 120, 130, 140, 150, 170 and 180) such as element 5 of FIG. 1, as elaborated herein, to perform optimization of inference of NNs according to some embodiments of the inventions.

As shown in FIG. 2, arrows may represent flow of one or more data elements to and from system 100 and/or among modules or elements of system 100. Some arrows have been omitted in FIG. 2 for the purpose of clarity.

As shown in FIG. 2, system 100 may receive (e.g., from a user) an original, or reference NN model M0, pretrained to perform a specific NN function. The received NN model M0 is denoted as element 210 in FIG. 2. Additionally, or alternatively, embodiments of the invention may receive or obtain one or more metrics 211 (e.g., 211A, 211B) pertaining to inference or execution of NN model M0 210.

For example, system 100 may receive or obtain one or more values of metrics of performance, also referred to herein as performance parameters 211B. Performance parameter values 211B may include for example a value of latency, a value of throughput, power consumption, etc., during execution or inference of M0 on a given computing device and/or dataset.

In another example, system 100 may receive or obtain one or more reference values of accuracy metrics 211A of reference NN model M0. These reference accuracy metric values may include, for example: accuracy, precision-recall trade-offs such as the F-measure metric, squared loss metrics, mean average precision (mAP) metrics and the like.

According to some embodiments, system 100 may receive a training dataset DS, denoted in FIG. 2 as element 220. Dataset DS 220 may be, or may include a set of pairs of data elements 221, e.g., {(x1, y1), (x2, y2), . . . , (xm, ym)}, or in vector form: {X, Y}, where X (denoted as 221A) may be referred to as a vector of data instances or examples, and Y (denoted as 221B) may be referred to as a vector of labels or annotations.

The term data instance may be used to refer to a data element that is included in a dataset. Pertaining to the same example, the training data set may include a plurality of images that may be used to train one or more elements included in NN model M0, and the term data instance may refer to any single such image included in the dataset.

For example, a data instance (e.g., an 'x' element 221A) may be an image given by a tensor of pixels, a vector of numerical values, a sequence representing text or audio recording and so forth, and a label (e.g., a 'y' element 221B) may be a scalar, a vector or, a tensor (e.g., an image) providing annotating information to a corresponding data instance 'x' in the context of a specific ML-based task. For example, in the case of image classification, 'x' may be an image, and 'y' may be an integer representing a class index. In another example, in the case of image segmentation, 'x' may be a first image, and 'y' may be a matrix (e.g., a second image) whose size is the same as the size of an input image 'x', such that each entry in y (e.g., a pixel) is a class index, designating the class of a corresponding pixel in the input image 'x'. In another example, the input data 'x' may be a vector input data element that may include "multi-modal" input data instances, e.g., a combination of several types of data such as image data instances, tabular data instances, scalar data instances, etc.

Figure 3:
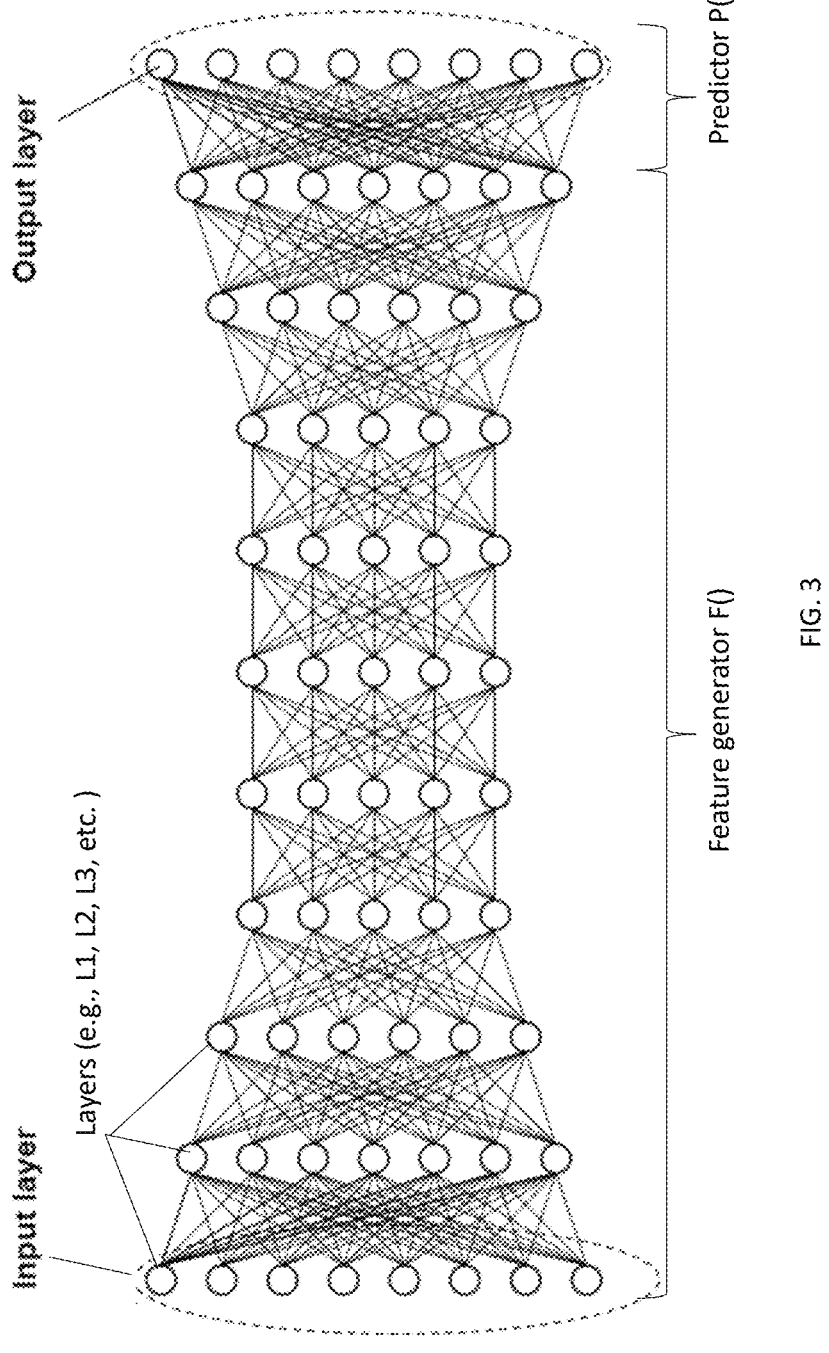
FIG. 3 is a schematic diagram, depicting a non-limiting example of a neural network model.

Reference is also made to FIG. 3, which depicts a non-limiting example of a neural network model such as NN model M0 210. According to some embodiments, reference model M0 210 may implement a function, M0: X→Y, from the instance space X to the label space Y (e.g., from a vector 'X' of one or more data instances to a vector 'Y' of one or more labels). Reference model M0 210 may include a feature generator F, and a prediction head P or predictor.

Feature generator F may include a plurality N of layers L, (e.g., L1, L2, . . . , $L_N$), which may be interconnected arbitrarily.

The function of M0 210 may thus be rewritten as in equation Eq. 1 below:

$$M0(x) = (P(F(x)): \ X \to Y \qquad \text{Eq. 1}$$

where F( ) represents the function of the feature generator, and P( ) represents the function of the predictor.

According to some embodiments, system 100 may receive at least one training scheme 230 data element. Training scheme 230 data element may be, or may include one or more definitions or configurations for training an ML model. For example, training scheme 230 may include a definition for configuration of a training process that may have been used to train NN model M0, using dataset DS 220.

For example, training scheme 230 may include a configuration of an optimization algorithm (or an "optimizer", as commonly referred to in the art), such as stochastic gradient descent (SGD) optimizer, an Adam optimizer, and the like. Additionally, or alternatively, training scheme 230 may include a definition or configuration of a simulated annealing of the training process, including for example a learning rate annealing schedule, such as a cosine decay schedule, as known in the art.

As elaborated herein, embodiments of the invention may utilize dataset DS 220 and/or training scheme 230 to train at least one NN architecture, to find an optimal NN model M*.

According to some embodiments, system 100 may receive an architecture space, denoted as element 240 of FIG. 2. Architecture space 240 may include a plurality of untrained candidate NN architectures, from which system 100 may select an optimal NN architecture A*, denoted as element 310 of FIG. 2, and/or an optimal trained NN model M*, denoted as element 320 of FIG. 2, as elaborated herein.

The plurality of untrained NN architectures of architecture space 240 may be capable of, or configured, after being trained, to perform a NN function or task, substantially similar to the NN function of reference model M0 210, on a given computing device. In other words, untrained NN architectures of architecture space 240 may be characterized by, or selected such that subsequent to training, they may be adapted to perform a NN function such as the NN function of reference model M0 210.

According to some embodiments, architecture space 240 may include an arbitrary variety of architectures. Alternatively, architecture space 240 may include a variety of architectures that may be sufficiently expressive, such that upon training they may achieve at least the accuracy values 211A of reference model M0 and/or the performance values 211B (e.g., run faster on computing device H 40). As known in the art, the term "expressive" or "expressivity" may relate to the effect of architectural properties of a NN (e.g., depth, width, layer types, etc.) on the computed NN functions or tasks, and their ensuing accuracy or performance. The expressiveness of a NN architecture in architecture space 240 may be controlled, for example, by increasing its depth (e.g., number of layers), increasing a complexity of one or more of its basic blocks (e.g., by increasing a number of channels), by adding residual links among neural nodes, adding attention layers, and the like.

According to some embodiment, system 100 may be, may include, or may be communicatively connected to at least one computing device H (denoted as element 40 in FIG. 2), upon which the NN model is to be inferred. In other words, embodiments of the invention may select an optimal NN architecture A* 310 and/or corresponding optimal NN model M* 320, in a sense that NN model M* 320 may be optimally fit to be inferred or executed by the software and hardware of computing device H 40, as elaborated herein.

Embodiments of the invention may produce a trained NN model, M* 320 that may be adapted to substantially perform the same NN function or task as that of reference NN model M0 210. For example, if NN model M0 210 is adapted to receive an image that includes a depiction of a face and perform a task of face recognition thereupon, then M* 320 may also be adapted to perform the face recognition ML task on incoming images. It may be appreciated that model M* 320 may be trained and/or tested, as commonly referred to in the art by a dataset DS 220 similar to, or equal to the dataset used for originally training and/or testing reference NN model M0 210.

It may be appreciated that NN architectures and models may exhibit a tradeoff between performance parameters and accuracy metrics. For example, as additional layers are added into a model, an accuracy of the model may be increased at the expense of performance (e.g., latency).

As elaborated herein, embodiments of the invention may produce a trained NN model, M* 320 that is optimal in relation to at least one performance parameter. Such optimization may be referred to herein as "performance optimization". In such embodiments, outcome NN model M* 320 may be referred to as "optimal", or "performance-optimized" in a sense it may: (a) preserve at least the accuracy metric value 211A of reference NN model M0 210, and (b) exhibit or have at least one performance parameter value 211B (e.g., latency, runtime, throughput, power consumption and the like) that may be maximally improved (e.g., shortest run time, lowest power consumption, etc.), in relation to the corresponding performance parameter value 211B of the original, pretrained reference NN model M0 210.

Additionally, or alternatively, embodiments of the invention may produce a trained NN model, M* 320 that is optimal in relation to at least one accuracy metric. Such optimization may be referred to herein as "accuracy optimization". In such embodiments, outcome NN model M* 320 may be referred to as "optimal" or "accuracy-optimized" in a sense that NN model M* 320 may: (a) preserve at least a predetermined performance parameter value 211B (e.g., latency, power consumption, etc.) of reference NN model M0 210, and (b) exhibit or have at least one accuracy metric value 211A that is maximally improved (e.g., highest accuracy, best F-measure metric values, etc.) in relation to the corresponding accuracy metric value 211A of the original, pretrained reference NN model M0 210.

According to some embodiments, system 100 may derive a selection of at least one optimal NN architecture A* 310 from architecture search space AS 240. System 100 may subsequently train optimal NN architecture A* 310, to produce optimal outcome NN model M* 320.

In the context of NN architecture A* 310, the term "optimal" may refer to an architecture that may solve a constrained optimization equation. For example, in the context of performance optimization, NN architecture A* 310 may solve constrained optimization equation Eq. 2A, below:

14

$$A^* = \text{argmax}_{A \in AS} PERF_H(A), \qquad \text{Eq. 2A}$$

$$\text{subject to } ACCU\ (A, DS) \geq ACCU(A0, DS)$$

where:

A* may represent a desired optimal architecture (e.g., element 310 of FIG. 2);

PERF(A) may represent a measured value of a parameter of performance of NN architecture A. It may be appreciated that the measured metric of performance $PERF_H$ (A) may be computed for, or in relation to a specific computing device, e.g., a specific hardware and/or software platform "H" (e.g., inference computing device H 40 of FIG. 2);

A0 may represent an architecture of reference NN model M0 (e.g., element 210 of FIG. 2);

DS may represent an input dataset (e.g., element 220 of FIG. 2); and

ACCU (A, DS) may represent a metric of accuracy of a specific architecture A over dataset DS. For example, architecture A may be partially trained, and ACCU (A, DS) may represent an accuracy metric value of partially trained architecture A, as measured on a subset (e.g., a validation data subset) of DS 220.

Additionally, in Eq. 2A, "AS" may represent a NN architecture search space (e.g., element 240 of FIG. 2). In other words, "AS" may be an aggregation of all possible NN architectures that may be implemented or executed on a relevant hardware and/or software platform H. It may be appreciated that "AS" be a confined NN search space. The term "confined" may be used herein to indicate that "AS" may not include all possible NN architecture configurations, but rather include a limited set of configurations. For example, AS may include an aggregation of architectures suitable for inference on computing device H 40.

It may be appreciated that a person skilled in the art may apply similar embodiments of the invention to optimize various objective performance metrics or parameters. For example, embodiments of the invention may be configured to produce a performance-optimized architecture A* that may optimize (e.g., maximize) throughput (e.g., the number of instances that can be calculated on H within a predefined unit of time) of the received architecture A0 of model M0. In another example, embodiments of the invention may be configured to produce a performance-optimized architecture A* that may optimize (e.g., minimize) the electric power consumption that may be required for calculation or execution of the model M0 on a hardware and/or software platform H.

Eq. 2A may be modified to produce optimal architecture A* according to specific optimization of performance parameters. For example, PERF(A) may represent a measured or calculated value of a mean inference latency of a NN architecture A. In such embodiments, Eq. 2A may be rewritten as Eq. 2A' below:

$$A^* = \text{argmin}_{A \in AS} Lat_H(A), \qquad \text{Eq. 2A'}$$

$$\text{subject to } ACCU(A, DS) \geq ACCU(A0, DS)$$

where "$Lat_H(A)$" may represent a measured metric of performance (e.g., a mean inference latency) of a NN architecture A.

Additionally, or alternatively, system 100 may be configured to produce optimal architecture A* according to specific optimization of accuracy metrics. In such embodiments, Eq. 2A may be modified to as Eq. 2A" below:

$$A^* = \text{argmax}_{A \in AS} ACCU(A, DS),\qquad \text{Eq. 2A''}$$
$$\text{subject to } PERF_H(A) \geq PERF_H(A0)$$

The term "partial training" may refer herein to a process of training a NN architecture, based on a relatively small training dataset (e.g., using a predefined portion or percentage of DS 220), and/or using a small number (e.g., 1) of training epochs to train the NN architecture. It may be appreciated by a person skilled in the art that partial training of a NN architecture may not necessarily produce a NN model adapted to perform a NN task with a predefined or adequate required level of accuracy. Therefore, partial training may consume significantly less (e.g., in at least one order of magnitude) computation resources (e.g., computing cycles, running time, etc.) in relation to full training of a NN architecture, which may be directed to produce a NN model of the required or adequate accuracy.

Following training of optimal architecture, A* 310, an optimal NN model M* 320 may be obtained. In other words, embodiments of the invention may automatically search for an optimal NN model M* among the models M corresponding to the architectures 'A' of an architecture space AS 240.

As elaborated herein, the term "optimal" may be used in this context to indicate optimal performance, where NN model M* may at least preserve an accuracy metric value of NN model M0 210 over dataset DS, and may have the best performance parameter value (e.g., lowest latency, highest throughput, minimal power consumption, and the like) over hardware H, among all architectures 'A' in architecture space AS 240.

Additionally, or alternatively, the term "optimal" may be used in this context to indicate an optimal accuracy metric, where NN model M* may at least preserve a performance parameter value of NN model M0 210, and may have the best accuracy metric value among architectures A in architecture space AS 240.

For example, in relation to latency performance optimization, embodiments of the invention may identify an optimal model M* 320 that corresponds to architecture A* as found in Eq. 2A'. In other words, a latency-optimized module M* may solve the following constrained optimization equation Eq. 2B':

$$M^* = \text{argmin}_{(M, \text{corresponding to } A \in AS)} Lat_H(M),\qquad \text{Eq. 2B'}$$

subject to ACCU (M, DS)≥ACCU (M0, DS)
Where:
  M0 is the reference NN model 210;
  LatH(M) is the mean inference latency (or any other required performance metric) of model M, computed over hardware platform H; and
  ACCU (M, DS) is the accuracy of model M over dataset DS.

It may be appreciated that system 100 may use any combination of measurable accuracy metric value 211A to evaluate the accuracy of models M of Eq. 2B'. Such accuracy metric values 211A may include for example, accuracy, precision-recall trade-offs such as the F-measure metric, squared loss metrics, mean average precision (mAP) metrics and the like, and any combination thereof. Additionally, or alternatively, system 100 may use any combination of measurable performance parameter values 211B to evaluate performance of models M of Eq. 2B'. Such performance metric values 211B may include, for example, latency, throughput, energy consumption, computing cycles consumption, memory consumption, and the like, and any combination thereof.

It may be appreciated that a brute force approach, whereby one trains all the architectures A in AS 240 and measures their performance parameter values (e.g., inference runtime) on H 40 can trivially achieve the task of identifying an optimal model M*. However, such an approach is clearly intractable because the training process of a single architecture requires substantial computing resources. For example, for a relatively small architecture space that includes 10,000 candidate architectures, and where training time of each architecture may be approximately three days on a strong accelerator such as a modern GPU (e.g., Nvidia V100), the computation time of the brute force approach would be 10,000*3=30,000 days, or over 82 GPU years.

As elaborated herein, system 100 may implement a scheme of multiplication search, or exponential search as commonly referred to in the art, and use fast capacity prediction of untrained or partially trained neural architectures, to perform this task two orders of magnitude faster in the worst case, and typically much faster.

As shown in FIG. 2, system 100 may include a capacity predictor module 140 (e.g., 140A, 140B, 140C), adapted to produce an estimation or prediction 141A of an accuracy metric value 221A of at least one architecture A. It may be appreciated that accuracy metric value 221A and the estimated accuracy metric value 141A may be used herein interchangeably.

Let A1, A2 ∈ AS be two different NN architectures of architecture space 240. A capacity predictor for space AS may include, or may implement a function f( ): AS→ℝ that with high probability satisfies equation Eq. 3 below:

$$ACCU(A1) \leq ACCU(A2) \leftrightarrow f(A1) \leq f(A2)\qquad \text{Eq. 3}$$

where ACCU(A) is a measured accuracy of architecture 'A' (e.g., A1 or A2) after training.

It may be appreciated that capacity predictor f( ) may be applied to untrained architectures, but may still be capable of ranking the final accuracy of architectures after they are trained (e.g., as NN models). A fast capacity predictor may be a capacity predictor whose computation time is much faster than the computation time required for fully training architectures A1 and/or A2.

Capacity predictors, whose running time only depends on the size or complexity of the underlying architecture, regardless of the data used, may be referred to herein as called "data-independent" capacity predictors. The run time of data-independent capacity predictors may be linearly dependent on the complexity or size of a relevant NN architecture, and may be very fast (e.g., in the order of 7-8 orders of magnitude) in relation to training time.

It may be appreciated that while perfect data-independent predictors, whose ranking performance may perfectly predict accuracy of underlying architectures are likely to be non-existent, non-perfect capacity predictors may still be very useful to ascertain an optimal architecture A*, as elaborated herein.

Figure 4:
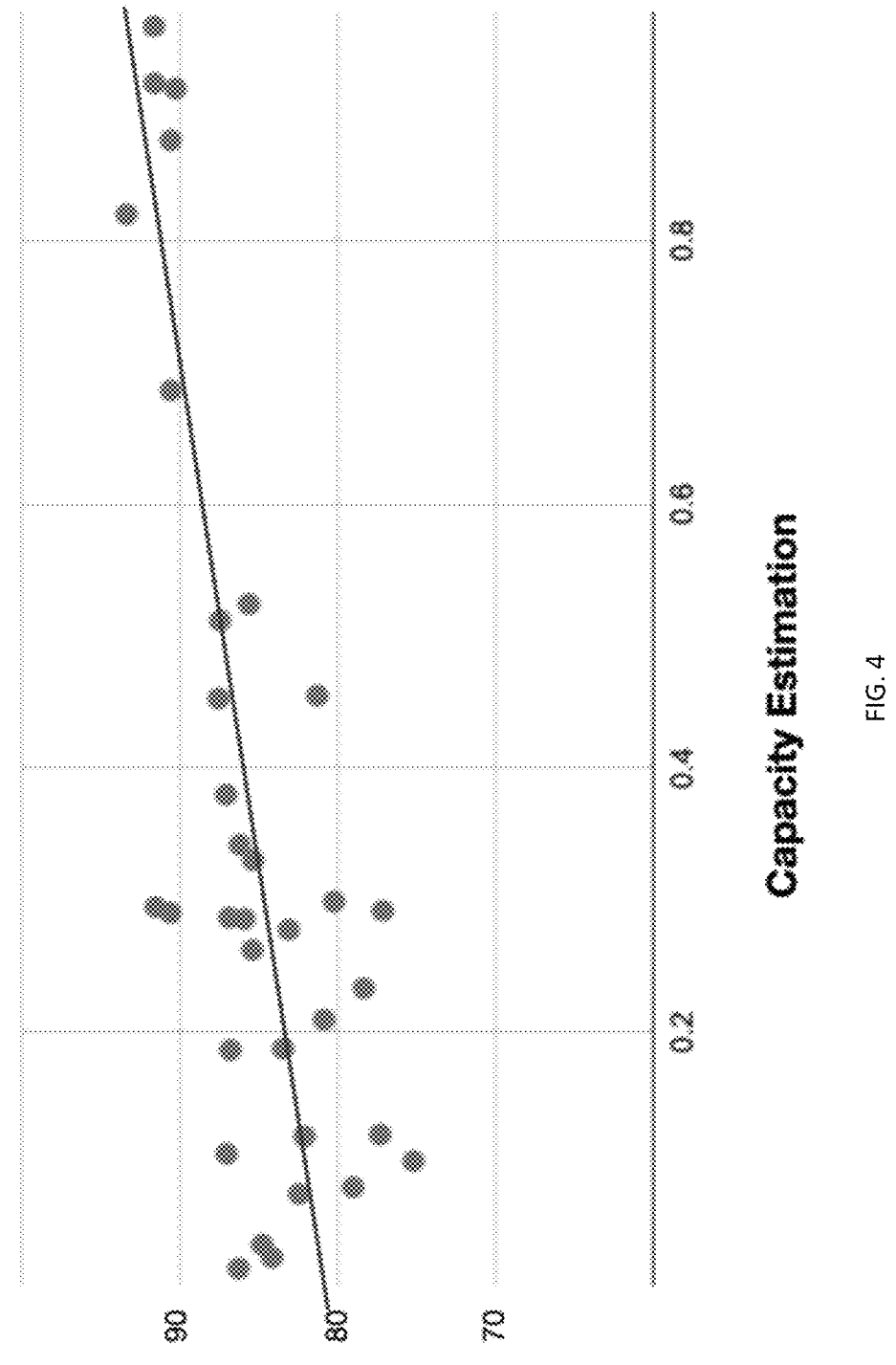
FIG. 4 is a scatter plot, depicting a non-limiting example of results of data-independent capacity prediction, according to some embodiments.

Reference is also made to FIG. 4, which is a scatter plot depicting results of data-independent capacity prediction, according to some embodiments.

In the non-limiting example depicted in FIG. 4, each point may represent one examined architecture before training, and a corresponding model after training: The 'X' axis value of each point may represent data-independent capacity prediction that was calculated by capacity predictor module 140 of FIG. 2 in relation to a specific architecture. The 'Y' axis value of each point represents a final, ground truth accuracy measurement of the respective model, after the relevant architecture was trained.

As shown in FIG. 4, it may be evident that the most accurate models, derived from architectures A of architecture space AS 240, may be found among the top valued (e.g., five) highest capacity predictions. This example clarifies that it may be possible to obtain non-perfect, yet very effective data-independent capacity prediction of accuracy performance metric values, without training the underlying architectures. While the estimation provided by capacity predictor 140 may not be perfect, and may only achieve 0.64 Spearman rank correlation in the depicted example, it may still be capable of identifying a subset of the most accurate architectures in hindsight.

It may be appreciated by a person skilled in the art that a computational complexity of a data-independent capacity predictor 140 (e.g., 140A) may be potentially minimal, allowing for very fast predictions. The prediction provided by a data-independent estimator may be solely based on the NN architecture's structure, regardless of the data itself. However, a particular NN function or task, as manifested by the data, and the interaction between the data and the architecture, may play a significant role in early predictions of the final architecture's accuracy. Therefore, embodiments of the invention may employ data-independent capacity predictors 140A, data-dependent capacity predictors 140B, and any combination thereof, as elaborated herein.

As depicted in FIG. 2, system 100 may include a performance estimator module 180, adapted to perform an initial evaluation or prediction 181A of a value of a performance parameter 211B for executing or inferring at least one (e.g., each) NN architecture A of architecture space AS 240 (A∈AS 240), as elaborated herein.

For example, the performance parameter 211B may be a latency performance parameter 211B. During an initial (e.g., preprocessing) stage, processor 110 may examine or evaluate one or more (e.g., each) architecture A, where A∈AS 240, in relation to the latency performance parameter 211B. In other words, processor 110 may collaborate with, or employ performance estimator module 180, and/or with computing device H 40, to compute the latency performance parameter 211B (in this example—the running time for inferring architecture A on computing device H 40).

According to some embodiments, performance estimator module 180 may evaluate performance parameter 211B for inferring NN architecture A on computing device H, without having to train NN architecture A, or even without having to introduce input data instances to NN architecture A.

For example, in order to evaluate performance parameter 211B (e.g., the running time or latency), performance estimator module 180 may: (a) sample a number of forward path computations of the untrained architecture A over computing device H 40; (b) measure the latency for each forward path computation (e.g., element 211D of FIG. 2); and (c) average the resulting latencies. As architecture A is untrained, performance estimator module 180 may perform these measurements while feeding the evaluated architecture A with random inputs.

Additionally, or alternatively, performance estimator module 180 may evaluate performance parameter 211B for inferring NN architecture A on computing device H, using a machine learning (ML) based methodology.

For example, performance estimator module 180 may include an ML-based model 185. ML-based model 185 may receive a first input that may include one or more structural data elements representing structural information pertaining to a NN architecture. ML-based model 185 may be trained to evaluate a latency metric (e.g., latency, throughput, required computing cycles, and the like) of the respective NN architecture, based on the first input of one or more structural data elements.

For example, the one or more structural data elements may represent a computational graph of a NN architecture A of AS 240, and may include structural information such as the number of layers in NN architecture A, a size (e.g., a number of nodes) in each layer, an extent of connectivity among nodes of different layers, and the like. During a training stage, ML-based model 185 may be trained to evaluate performance parameter 211B (e.g., a latency metric, such as latency, throughput, etc.) of a NN architecture, based on the structural information. In a subsequent operational stage, performance estimator module 180 may obtain from the ML-based model 185 a predicted evaluation 181A of the NN architecture A latency metric, based on the first input of structural data elements of the NN architecture.

Additionally, or alternatively, ML-based model 185 may receive, e.g., as a second input, one or more computing device parameters, representing characteristics of a computing device. In the example of FIG. 2, the one or more computing device parameters may include, for example characteristics or parameters of inference computing device H 40, including for example, a number of computing cores or processors of computing device H 40, a type and/or a make of one or more processors of computing device H 40, a type and size of memory that is at the disposal of computing device H 40, and the like. During a training stage, ML-based model 185 may be trained to evaluate a latency metric (e.g., latency, throughput, etc.) of a NN architecture, based on the first input data element (e.g., the one or more structural data elements), and on the second input data element (e.g., pertaining to computing device parameters or characteristics). During a subsequent operational stage, performance estimator module 180 may obtain from ML-based model 185 a predicted evaluation of the NN architecture latency metric based on the first input and the second input.

Thus, performance estimator module 180 may utilize ML model 185 to evaluate or predict a performance parameter or metric 2111B, to produce an evaluated or predicted performance metric (e.g., latency metric) value 181A of NN architecture A, when inferred on computing device H 40.

It may be appreciated that performance estimator module 180 may obtain the predicted performance metric (e.g., latency metric) value 181A, without actually having to measure, sample and/or average the performance metric values 211B on computing device H 40. It has been experimentally shown that such prediction of performance metric 211B, and may expedite the process of performance estimation immensely, reducing the duration of latency estimation by approximately 3 orders of magnitude, without significantly affecting the accuracy of the performance metric evaluation.

Performance estimator module 180 may thus obtain, for one or more (e.g., each) architecture A an evaluated performance metric value 181A, denoted as $PERF_H(A)$ in Eq. 2A, and/or denoted as LatH(A) in the example of Eq. 2A'.

For example, the evaluated performance metric value 181A (e.g., $PERF_H(A)$ of Eq. 2A) may include a numeric value representing an evaluated latency, an evaluated number of required computing cycles, an evaluated consumption of power, and the like. Embodiments of the invention may further expedite this computation by parallelizing the evaluation 181A of the performance metric value (e.g., latency), for example by using a plurality of instances of computing device H 40.

According to some embodiments, during a training stage, processor 110 may receive (e.g., from input element 7 of FIG. 1) a training dataset that may include one or more annotated, or labeled performance data elements 185A. Annotated performance data elements 185A may include, or may represent ground truth information pertaining to at least one performance metric (e.g., actual latency metric) value. Processor 110 may collaborate with training model 170 to train ML model 185 to evaluate or predict performance metric value (e.g., latency metric value) 181A for an incoming NN architecture A, based on the received labeled performance data elements 185A of the training dataset, as known in the art.

According to some embodiments, labeled performance data elements 185A may be obtained from at least one inference computing device H 40. For example, and as elaborated herein, performance estimator module 180 may evaluate performance metric value 181A (e.g., the running time or latency) on computing device H by measuring the latency of one or more NN architecture forward path computations (e.g., element 211D of FIG. 2) on inference computing device H 40. According to some embodiments, performance estimator 180 may subsequently use the measured latency 211D as labeled performance data elements 185A, to train ML model 185.

Additionally, or alternatively, ML model 185 may be an active learning model. As known in the art, active learning ML models may be adapted to selectively request labels or annotations for specific data instances, and may thus expedite the training process. For example, ML model 185 may emit (e.g., to training module 170) a request to provide a label, or an annotated performance data element that correspond to one or more specific NN architecture. Training module 170 may collaborate with processor 110 to obtain this annotation or label (e.g., via input element 7 of FIG. 1). Processor 110 may receive one or more annotated performance data elements or labels, according to the request, and may collaborate with training module 170 to train ML model 185 based on a training dataset that may include the at least one requested labeled performance data element 185A.

Figure 5:
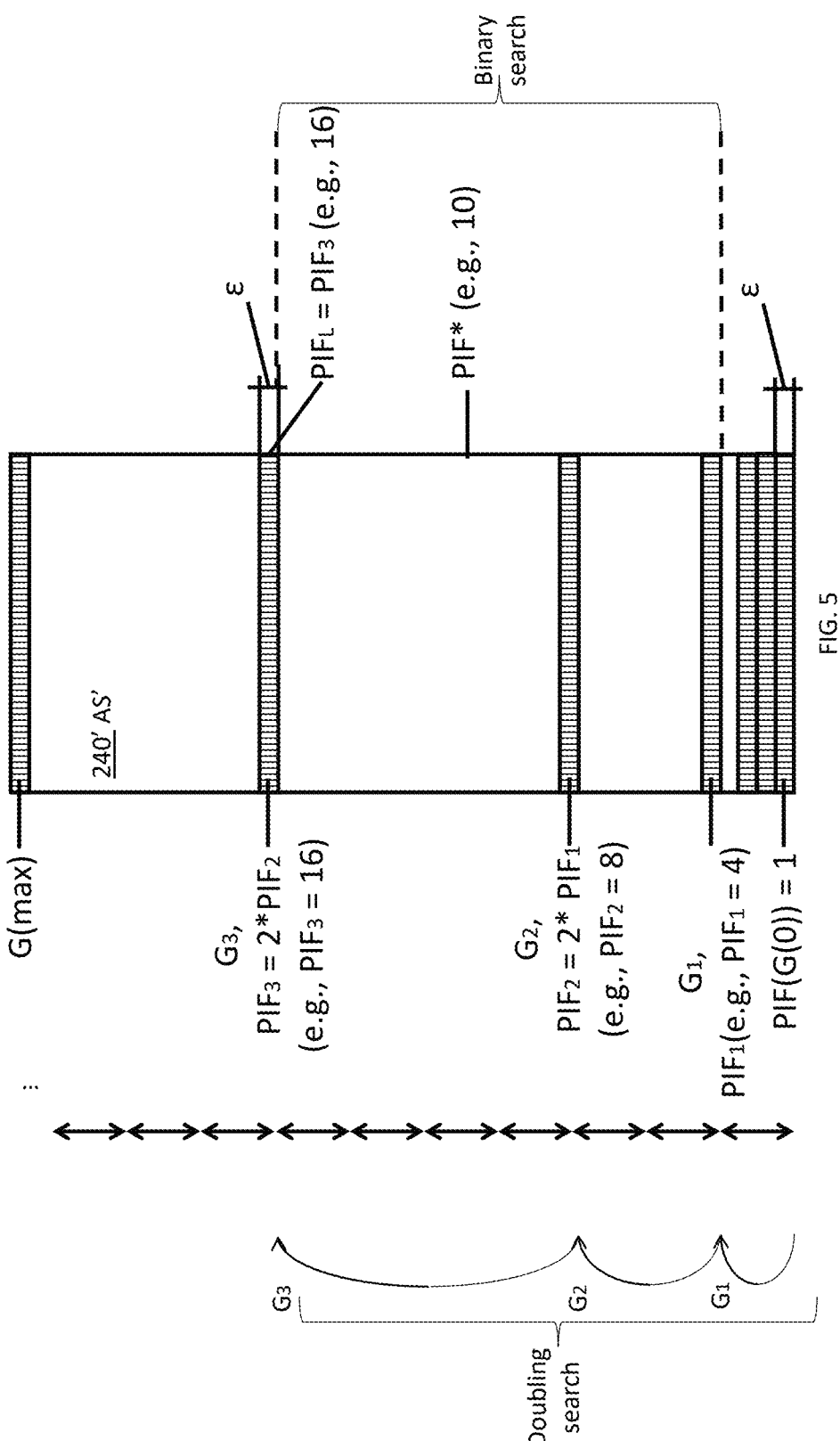
FIG. 5 is a schematic diagram, presenting an example of a search algorithm, designed to obtain an optimal architecture A*, according to some embodiments of the invention.

Reference is also made to FIG. 5, which is a schematic diagram, presenting an example of a search algorithm, designed to obtain an optimal architecture A*, according to some embodiments of the invention.

According to some embodiments, processor 110 may sort the architectures of AS 240 according to the evaluated performance metric value (e.g., latency) to obtain a sorted version AS' 240' of architecture space AS 240.

As shown in FIG. 2, system 100 may include a performance grouping module 130, adapted to divide architecture space AS 240 (or sorted architecture space AS' 240'), to a plurality of groups. As depicted in the non-limiting example of FIG. 5, performance grouping module 130 may divide architecture space AS 240 to slices or groups (denoted as elements G(i) or $G_i$), based on the evaluated performance metric value 181A (e.g., latency value), according to a predefined resolution parameter ε as elaborated herein (e.g., in Eq. 4, Eq. 4'). For example, as elaborated herein, performance estimator module 180 may estimate or predict a performance metric value 211B such as a latency metric value. The estimated or predicted metric value (e.g., estimated latency value) is denoted as element 181A of FIG. 2. Performance grouping module 130 may divide architecture space AS 240 (or sorted architecture space AS' 240') according to the estimated or predicted values 181A (e.g., latency values) of the respective architectures A of AS 240. As depicted in the example of FIG. 5, one or more (e.g., each) group of AS 240 may correspond to a specific, unique range of values of the evaluated performance metric value 181A (e.g., latency).

Additionally, or alternatively, each group (E.G., $G_i$) of AS 240 may correspond to a unique range of a performance improvement factor, $PIF_i$, representing improvement of performance in relation benchmark or reference performance parameter value 211B of reference model M0.

As elaborated herein, the term "performance improvement factor" (PIF) may be used herein to refer to any type of factor or parameter that represents improvement of one ML architecture in relation to another ML architecture, in respect to a corresponding performance parameter of interest. Pertaining to the example of a performance parameter 211B that is latency or run time, PIF may be referred to as a "speedup factor", indicating an increase in speed (e.g., reduction of latency) of execution of a given NN architecture, in relation to architecture A0 (e.g., corresponding to reference model M0). It may be appreciated that the following discussion relates extensively to the non-limiting example of latency performance parameter 211B, but other performance parameters 211B (e.g., power consumption) and corresponding PIFs may also be used, with the required adjustments.

The following description may use the following notation of indices of NN architecture groups in parenthesis G(i) (e.g., G(0), G(1), . . . , G(n)) to represent groups of NN architectures in architecture space AS 240. Additionally, each group (e.g., G(1), G(2), etc.) may correspond to a different PIF (e.g., speedup factor), in a monotonously ascending order.

In other words, for each pair of groups G(i), G(j) of NN architectures in architecture space AS 240, where PIF(G(i)) represents the PIF of NN architectures in group G(i) and PIF(G(j)) represents the PIF of NN architectures in group G(j), then $i<j \rightarrow PIF(G(i))<PIF(G(j))$. For example: $PIF(G(1))<PIF(G(2))<PIF(G(3))$, etc.

According to some embodiments, system 100 may employ an iterative search algorithm to find an optimal group G* among the plurality of groups G(i) in architecture space AS 240 (or sorted architecture space AS' 240'), as elaborated herein. Therefore, the following description may also use notation of indices of groups and corresponding PIFs in subscript (e.g., $S_i$, $S_{i+1}$, $S_{i+2}$, and $PIF_i$, $PIF_{i+1}$, $PIF_{i+2}$) to represent groups and corresponding PIFs (e.g., speedup factors) that are considered in the relevant iteration of the search process.

For example, a group that is examined in an i'th iteration (e.g., $G_i$) may be characterized by a PIF (e.g., speedup factor) of $PIF_i$, Group $G_i$ may also be the n'th group (e.g., G(n)) of architecture space AS 240 (or sorted architecture space AS' 240'), characterized by a PIF (e.g., speedup factor) of PIF(n).

Thus, the subset of NN architectures included in group G(i), corresponding to PIF(i) may be defined according to equation Eq. 4, below:

$$G(i) = \{A | (PIF(i) - \varepsilon) \le PIF(A) \le (PIF(i) + \varepsilon)\}, \qquad \text{Eq. 4}$$

where G(i) represents the range of NN architectures included in a group indexed 'i';

$\varepsilon$ is a predetermined resolution parameter, differentiating between groups of NN architectures;

A is a NN architecture included in group G(i)

PIF(i) represents a PIF (e.g., speedup factor) of corresponding group G(i); and

PIF(A) denotes the PIF (e.g., speedup factor) achieved by architecture A in relation to architecture A0 of reference model M0 210.

Additionally, or alternatively, Eq. 4 may be rewritten to define the groups or subsets of NN architectures that are examined or considered during an iteration (i) of the iterative search algorithm, as shown in Eq. 4', below:

$$G(i) = \{A | (PIF(i) - \varepsilon) \le PIF(A) \le (PIF_i + \varepsilon)\} \qquad \text{Eq. 4'}$$

where $G_i$ represents the range of NN architectures considered in the current iteration; and $PIF_i$ represents the PIF (e.g., speedup factor) of group $G_i$ of the current iteration.

According to some embodiments, a first group (denoted G(0)) of architecture space AS 240 may correspond to a group or subset of NN architectures that may include architecture A0 (e.g., the architecture corresponding to reference model M0 210). The estimated or predicted performance parameter values (e.g., latency values) 181A of group G(0) may therefore have similar performance parameter (e.g., latency metric) values as that of architecture A0. Therefore, the PIF of group G(0) is 1 (having no improvement over NN architecture A0). This is denoted in FIG. 5 as "PIF(G(0))=1", indicating that the architectures included in group G(0) have a speedup factor substantially equivalent to '1', e.g., have substantially equal latency, in relation to reference architecture A0. The term "substantially equivalent" may refer herein to indicate two NN architectures, for which the difference between their respective evaluated performance metric values 181A is below the predefined resolution parameter $\varepsilon$.

As explained herein, group G(1) may have, or be characterized by a PIF (e.g., speedup factor) value which may be denoted PIF(1). Pertaining to the example of latency performance parameter 211B, PIF(1) may be equal to 4, indicating that NN architectures included in group G(1) may have a speedup factor PIF(1)=4 in relation to architecture A0. In other words, NN architectures included in group G(1) may have a latency that is substantially 1/G(1) (e.g., ¼) of the latency of reference NN architecture A0.

A performance-optimal, accuracy-preserving architecture A* in AS 240 may have an accuracy that is substantially equivalent to that of NN architecture A0 of model M0 21, and have a PIF denoted as PIF*.

In the example of latency, A* may be PIF* times faster, or have a speedup factor of PIF*, or a latency that is PIF* times smaller than architecture A0, which corresponds to reference NN model M0 210. It may therefore be said that A* achieves a speedup factor of G* over A0. As elaborated herein, system 100 may initially search for optimal group G*

(e.g., a group corresponding to optimal speedup factor PIN*), and then determine or select an optimal NN architecture A* among the NN architectures of optimal group G*.

For example, resolution parameter $\varepsilon$ may be 0.01. The speedup factor search space may therefore include a range of speedup factors and corresponding groups, that follow the sequence PIF=(PIF(G(0))=1, 1.01, 1.02, . . . PIF(G(max))), where '1' may represent the speedup factor of group G(0) (e.g., the group that includes A0), and PIF(G(max)) may represent the speedup factor of the fastest NN architectures in AS' 240'.

As shown in FIG. 2, system 100 may include a search module 120 adapted to search for an optimal group G* of AS 240, as elaborated herein. According to some embodiments, search module 120 may initially employ a multiplication search module 121A, adapted to perform an iterative multiplication search process among the plurality of groups S, to determine a limit group $S_L$. Subsequently, search module 120 may employ a binary search model 121B, adapted to perform an iterative binary search, among a subset of groups G of sorted Architecture space AS 240/240', to determine optimal group G*. The subset of groups S in the binary search may be limited by group $G_L$, provided by multiplication search module 121A.

According to some embodiments, search module 120 may perform a search among the groups of architecture space AS 240 (or sorted architecture space AS' 240'), to determine a group that (a) corresponds to the best evaluated performance metric value 181A (e.g., a minimal evaluated latency), and yet (b) includes at least one NN architecture that maintains an accuracy metric value 141 that is at least equal to the reference accuracy value 211A of reference model M0 210.

In a first step or iteration (e.g., i=1), multiplication search module 121A may begin with a predefined, initial speedup factor $PIF_1$, corresponding to group $G_1$ in the example of FIG. 5. The initial PIF value (e.g., speedup factor), denoted $PIF_i$, may for example be defined as a hyperparameter of system 100, and may be based, for example on prior knowledge pertaining to the architecture A0 of reference NN model M0 210.

Search module 120 may subsequently consider a subset of architectures A of AS 240/240', e.g., $G_1 \in AS$, that may include all the architectures A that achieve a PIF (e.g., speedup factor) of $PIF_1$, within a range pertaining to resolution parameter $\varepsilon$. In other words, pertaining to the example of latency optimization, subset, or group $G_1$ may include the NN architectures that are characterized by a latency LatH (A)=LatH(A0)/$PIF_1$. This subset may be denoted in FIG. 5 as the group of NN architectures that correspond to the PIF (e.g., speedup factor) of $PIF_1$: the NN architectures of group $G_1$.

Using equation Eq. 4', the range of NN architectures included in subset $G_1$, in the first step or iteration of the multiplication search may be defined as:

$$G(i) = \{A | (PIF_1 - \varepsilon) \le PIF(A) \le (PIF_1 + \varepsilon)\} \qquad \text{Eq. 4' (1}^{st}\text{ iteration)}$$

where $\varepsilon$ is the resolution parameter;

$G_1$ represents the range of NN architectures considered in the first iteration;

A is a NN architecture included in $G_1$ $PIF_1$ represents the PIF (e.g., speedup factor) of the architectures in the first iteration; and PIF(A) denotes the PIF (e.g., speedup factor) achieved by architecture A in relation to architecture A0 of reference model M0 210.

For example, for an initial speedup factor $PIF_1=4$, and for a resolution parameter $\varepsilon=0.01$, search module 120 may initially consider group $G_1$ that includes a subset of all architectures $A \in AS$ 240, whose speedup factor is $4 \pm 0.01$.

It may be appreciated that other embodiments may consider different subsets or ranges of AS 240, including for example $PIF_1 \pm (\varepsilon/2)$, a subset that includes the range of $[PIF_1, PIF_1+\varepsilon]$, and the like.

According to some embodiments, capacity predictor 140 may subsequently apply a fast capacity prediction function (e.g., 140A, 140B, 140C) on one or more (e.g., all) architectures A of the current subset (e.g., $G_1$), to obtain an estimation of an accuracy metric value 141 for one or more (e.g., each) NN architecture, as elaborated herein (e.g., in relation to FIG. 4). Capacity predictor 140 may sort the architectures of the currently obtained subset (e.g., group $G_1$), for example in descending order of their predicted accuracy metric value 141.

Capacity predictor 140 may select a predefined number K of the top valued capacity predicted architectures, e.g., having the top K estimated or predicted accuracy metric values 141. According to some embodiments, the definition or choice of K may be done in correspondence to accuracy of the used capacity predictor, such that the set of top K architectures may include one of the top ranking values, e.g., the most accurate architectures, with high probability. For example, taking K=5 in the example of FIG. 4 may produce a sufficient group of NN architectures to include an architecture that would correspond to the most accurate model M (subsequent to, or after being trained). Additionally, or alternatively, the size of the selected subset (e.g., K) of the current group $G_i$ may be determined as a predefined percentage of the NN architectures of the current group. Additionally, or alternatively, the size of the selected subset (e.g., K) of the current group $G_i$ may be determined as a predefined number of NN architectures in the current group.

As shown in FIG. 2, system 100 may include a training module 170 adapted to train one or more NN architectures or models, based on training dataset 220, as known in the art. As known in the art, training of a NN architecture may produce a trained NN model. Therefore, the term "training" may refer herein to both a model and an architecture, and may be used interchangeably, according to context.

According to some embodiments, training module 170 may train the NN architectures of the currently obtained subset (e.g., $G_1$), that correspond to the top K estimated capacity values (e.g., the top 5 dots in FIG. 4). Training module 170 may do so based on dataset DS 220 as a training set. Additionally, or alternatively, training module 170 may use training scheme 230 for training the NN architectures of the currently obtained subset, as known in the art. Training module 170 may subsequently obtain K trained NN models, corresponding to the selected top ranking or top valued estimated or predicted capacity (e.g., K top accuracy metric values) NN architectures of the current subset (e.g., $G_1$).

According to some embodiments, processor 110 may subsequently infer the K obtained models M on one or more instances of inference computing device H 40, and may measure the accuracy of each of the K obtained models M over an independent test set. In other words, processor 110 may measure a value of at least one accuracy metric value 211A for each of the K obtained models M to determine a model Mi that has the best (e.g., highest) accuracy metric value 211A among the K trained models M of iteration i.

Search module 120 may compare the measured accuracy metric value 221A of model $M_i$ over a Test Dataset (TDS) (e.g., Acc ($M_i$, TDS)) to the accuracy of reference model M0 210 over the same test dataset (TDS) (e.g., Acc (M0, TDS)). Search module 120 may then set the PIF (e.g., speedup factor) of the next iteration (e.g., $PIF_{i+1}$) of the multiplication search process based on the comparison.

For example, in each iteration (i), the PIF (e.g., speedup factor) of the following iteration (e.g., $PIF_{i+1}$) may be set according to equation Eq. 5, below:

$$PIF_{i+1} = MULT * PIF_i, \text{ if } (Acc\ (M_i, TDS) \geq Acc\ (M0, TDS)) \quad \text{Eq. 5}$$

where $PIF_i$ represents the PIF (e.g., speedup factor) of the present iteration;

$PIF_{i+1}$ represents the PIF (e.g., speedup factor) of the next iteration;

MULT is a predetermined or predetermined multiplication factor or parameter (e.g., MULT=2), which may be set (e.g., via input 7 of FIG. 1) to determine a speed at which the multiplication search is performed;

$M_i$ represents the model that has the best (e.g., highest) accuracy metric value among the K trained models in the group of the current iteration $G_i$;

Acc ($M_i$, TDS) represents the measured accuracy metric value of $M_i$ over the test dataset; and Acc (M0, TDS) represents the measured accuracy metric value of reference model M0 210 over the test dataset.

Pertaining to the same example where $PIF_{i=1}$ was 4, and MULT=2, then following equation Eq. 5, if (Acc ($M_i$, TDS)$\geq$Acc (M0, TDS)), then the PIF (e.g., speedup factor) of the second iteration (e.g., $PIF_{i+1}=PIF_2$) is MULT*$PIF_1$=8.

The subsequent subset of the second iteration, $G_2$ may be set in a similar manner as described above in relation to $G_1$, as elaborated in equation Eq. 4', below. In other words, equation Eq. 4' may define the NN architectures of group $G_2$ of architecture set AS 240, as:

$$G_2 = \{A | (PIF_2 - \varepsilon) \leq PIF(A) \leq (PIF_2 + \varepsilon)\} \quad \text{Eq. 4' (second iteration)}$$

According to some embodiments, multiplication search module 121A may thus continue as elaborated above, to iteratively search for a group $G_L$ that corresponds to a maximal, or limit PIF (e.g., speedup factor) $PIF_L$. For example, $PIF_L$ may be defined as the speedup factor of an iteration L, that corresponds to the first group $G_L$, where $G_L$ does not include a NN architecture having at least the same accuracy metric value 211A as that of reference model M0 210 (and corresponding architecture A0). Equation 5 may thus be rewritten as equation Eq. 5' below:

$$PIF_{i+1} = MULT * PIF_i, \text{ if } (Acc\ (M(i), TDS) \geq Acc\ (M0, TDS)), \quad \text{Eq. 5'}$$

$$\text{and } PIF_L = PIF_{i+1} = PIF_i, \text{ otherwise.}$$

In other words, each iterative step (i) of the multiplication search may relate to a current group $G_i$, corresponding to a performance parameter (e.g., latency metric) value 211B L (e.g., denoted $Lat_H(A)$ of Eq. 2A'). Each iterative step of the multiplication search may include (a) estimating or predicting (e.g., by fast capacity predictor f( ) 140, as elaborated herein) an accuracy metric value 141 of NN architectures within the current group $G_i$; (b) if at least one accuracy metric value 141 of the current group $G_i$ is at least equal to the reference accuracy value, then moving to a next group $G_{i+1}$ that corresponds to PIF*MULT (e.g., latency L/2, or $PIF_{i+1}=2*PIF_i$); and (c) determining the first group $G_L$ which does not comprise a NN architecture that maintains an accuracy metric value 141 that is at least equal to the reference accuracy metric value of reference ML model M0, as the limit group GL (e.g., $G_L=G_{i+1}=G_i$).

According to some embodiments, system 100 may further include (e.g., as part of search module 120) a binary search module 121B.

According to some embodiments, after a first stage, where multiplication search module 121A obtains maximal or limit speedup factor $PIF_L$ (and corresponding group $G_L$), binary search module 121B may perform a binary search for an optimal PIF* (and corresponding group G*), throughout the range of architectures between the group of G(0) (or $PIF_1$) and the group of $G_L$. Additionally, or alternatively, binary search module 121B may perform the binary search for optimal PIF* (and corresponding group G*) between group of $G_{L-1}$ (e.g., the last group which included at least one accuracy metric value 141 that is at least equal to the reference accuracy value)=and the group of $G_L$.

According to some embodiments, binary search module 121B may perform the iterative binary search according to equation Eq. 5" below:

$$PIF_{i+1} = 2*PIF_i, \qquad \text{Eq. 5"}$$

$$\text{if } [(\text{Acc } (Mi, TDS) \geq \text{Acc } (M0, TDS)) \text{ and } (PIF_{i+1} \leq PIF_L)],$$

$$\text{and } PIF_{i+1} = PIF_i/2, \text{ otherwise.}$$

In other words, each iterative step (i) of the binary search may relate to a current group $G_i$, corresponding to a PIF value $PIF_i$(e.g., a speedup factor of latency L, or $Lat_H(A)$ of Eq. 2A). Each iterative step (i) of the binary search may include: (a) estimating (e.g., by fast capacity predictor f( ) 140, as elaborated herein) an accuracy metric value 141 of NN architectures within the current group $G_i$; (b) if at least one accuracy metric value 141 of the current group $G_i$ is at least equal to the reference accuracy value of model M0, then moving to a next group $G_{i+1}$ that corresponds to $PIF_{i+1}=2*PIF_i$ (e.g., latency L/2); and (c) if no accuracy metric value of the current group Si is at least equal to the reference accuracy value, then moving to a next group that corresponds to $PIF_{i+1}=PIF_i/2$ (e.g., latency 2L).

For example, consider the sequence of all PIFs (e.g., speedup factors) between G(0) (PIF=1) and $G_L$: {1, 1+ε, 1+2ε, . . . , $G_i$, . . . $G_L$}, where the index of the optimal speedup factor PIF* is 'i'. (G*=$G_i$, the group of iteration 'i'). The first stage of the search process, performed by multiplication search module 121A may require an order of O(log(i)) iterations. This is because multiplication search module 121A may keep multiplying (e.g., doubling) the speedup factor exactly t=log(i) times, until $G_i \geq G*$. Then, at a second stage of the search process, binary search module 121B may perform a binary search among at most 2i elements, in O(log(i)) iterations.

As a numerical example, consider the case in which ε=0.1, and assume that PIF*=10. As depicted in the example of FIG. 5, starting with $PIF_1$=4, multiplication (e.g., doubling) search module 121A may perform two additional iterations to get $PIF_3$=16. Subsequently, binary search module 121B may perform a binary search among ((16−8)/0.1) =80 group elements, which may require at most 7 iterations, until the optimal PIF (e.g., speedup factor) PIF*=10 (and corresponding optimal group G*) is identified.

It may be appreciated that by identifying the optimal PIF (e.g., speedup factor) PIF*, system 100 may also identify or select a group G* of AS 240, that includes a subset of NN architectures, as defined by resolution parameter ε (e.g., by Eq. 4 and/or Eq. 4').

As elaborated herein (e.g., in relation to FIG. 2), capacity predictor module 140 may produce an estimated value 141 of an accuracy metric value 211A of one or more (e.g., each) NN architectures within determined optimal group G* (corresponding to optimal PIF (e.g., speedup factor) PIF*). According to some embodiments, training module 170 may train one or more (e.g., K) NN architectures of the selected or determined group G*. The K NN architectures of the selected or determined group G* may correspond to the top estimated accuracy metric values 141, as determined by fast capacity prediction module 140. Training module 170 may train the K selected architectures based on dataset 220 and training scheme 230 as known in the art, to perform the NN function of reference model M0 210. Processor 110 may then infer the K trained models on computing device H 40, and may measure or evaluate the accuracy metric value 211C of the K trained NN architectures (now K trained models), on computing device H 40, using a validation data set in DS 220.

Processor 110 may then select or determine the best model M*, e.g., having the highest measured accuracy metric value 211C, among the K trained models of the group G* of the optimal PIF (e.g., speedup factor) PIF*. Processor 110 may subsequently emit the determined best model M* 320 and/or the corresponding architecture A* 310 as output.

Additionally, or alternatively, processor 110 may infer best model M* 320 (e.g., on inference computing device H 40) to optimally perform the predefined, underlying NN function.

It may be appreciated that output model M* 320 may be used for runtime inference, on incoming data instances to optimally perform the NN task or function of reference NN model M0 210. In some embodiments, output model M* 320 may have an optimal performance parameter 211B value (e.g., optimally reduced latency), while maintaining at least the accuracy metric value 211A of reference NN model M0 210. Additionally, or alternatively, output model M* 320 may have an optimal accuracy metric value 211A, while maintaining at least the performance parameter 211B value of reference NN model M0 210.

As elaborated herein (e.g., in relation to FIG. 4), capacity predictor module 140 may apply a data-independent capacity prediction 140A function on one or more architectures of AS 240, to obtain an estimation of at least one accuracy metric value. According to some embodiments of the invention, the data-independent capacity prediction function may be derived from classical results of statistical learning theory, and in particular, from the Vapnik-Chervonenkis (VC) dimension, as known in the art.

Let HS be a Hypothesis Space, containing possibly infinite binary prediction functions. The VC-dimension of HS (e.g., denoted VC(HS)), may measure or represent a complexity or expressive power of HS, by counting the largest set of size N such that each of its possible $2^N$ binary labeling can be perfectly labelled by functions from HS.

In the context of deep neural networks (DNNs), one may view a single architecture as a set of predictors, that includes all synaptic weight assignments that the architecture may assume. The classical use of the VC-dimension in statistical learning theory is to form generalization bounds. The incentive of such bounds may be to find useful hypothesis classes that have a minimal VC-dimension (e.g., correspond to a minimal complexity of the architecture). In contrast, and according to some embodiments of the invention, capacity prediction function 140A may search for architectures whose VC-dimension may be maximal. The reason for this opposite usage is recent empirical findings that very large, (e.g., commonly referred to as "overparametrized") DNNs learn to better generalize incoming data instances that may not have been included in a trained dataset. While such findings challenge the classical theory, they become very handy in the context of the present invention.

According to some embodiments, a VC-based data-independent fast capacity predictor 140A may be constructed using the formula of equation Eq. 6, below:

$$VC(M) \approx$$
$$d + \left(\sum_{i=1}^{d} (d-i+1) \ q \ (i)\right) \log \left(8e \sum_{i=1}^{d} ia(i) \log\left(4e \sum_{j=1}^{d} ja(j)\right)\right)$$

Eq. 6 which approximately gives the VC-dimension of a feed-forward architecture M of depth d, such that the architecture's $i^{th}$ layer, ($1 \leq i \leq d$) has a(i) activations and q(i) weights.

As elaborated herein, capacity predictor 140 (e.g., 140B) may be or may implement a data-dependent capacity prediction function f( ), that may compute its estimation of an architecture's accuracy metric value with respect to incoming data (e.g., dataset DS 220).

Intuitively, a data-dependent capacity prediction 140B function, f(A,DS), may provide more accurate capacity prediction by taking into consideration the ability of a given architecture (e.g., A) to fit specific data (e.g., DS).

According to some embodiments, capacity prediction 140 may be, or may implement a progressive capacity prediction function 140C. The term "progressive" may be used in this context to indicate a process of capacity prediction that may be performed iteratively, or in stages, where each stage may allocate or require progressively increasing computational resources of inference computing device H 40. In other words, estimation of the accuracy metric values 141 of NN architectures of a current group $G_i$ may be performed iteratively, where each iterative step of accuracy estimation may employ progressively increasing computation resources of inference computing device H 40.

These computational resources may include, for example, memory, Floating Point Operations Per Second (FLOPS), training cycles, training epochs, training time, training dataset size, and the like. The computation resources may be specified by a parameter RES, or a vector of parameters {RES(1), RES(2), . . . , RES(r)}, where each index of the computation resources vector indicates a progression, or a stage of the progressive capacity prediction 140C process.

According to some embodiments, system 100 may include a resource allocation module 150, adapted to communicate with inference computing device H 40, and control the allocation of computing resources of inference computing device H 40, according to the stages of the progressive capacity prediction 140C process.

The progressive capacity prediction function 140C f(A, RES) may be thus declared as f. AS X RES→R (where R represents the Real numbers space). In other words, a progressive capacity prediction function 140C f(A, RES)

may estimate or predict the capacity of the architecture A using RES units of computation (e.g., FLOPS, training cycles, etc.).

According to some embodiments, capacity predictor 140 may increasingly improve or refine predictions or estimations of accuracy metrics of architectures A, by initially using minimal computational resources and gradually allocating additional computational resources as required. Therefore, it may be appreciated that by using progressive capacity prediction 140C, embodiments of the invention may optimally consume computing resources (e.g., computing resources of inference computing device H 40), to efficiently and quickly obtain optimal NN architecture A* 310 and/or optimal NN model M* 320.

According to some embodiments, capacity predictor 140 may be or may implement any combination of a data-dependent capacity prediction function 140B and a progressive capacity prediction function 140C. It has been experimentally shown that such a combination may prove to be most effective in efficiently evaluating architectures A of AS 240.

For example, capacity predictor 140 may collaborate with training module 170, to obtain a data-dependent, progressive estimation function f(A, RES, DS) in a straightforward manner, by (a) partially training the (initially untrained) architecture A for n training cycles, using a training data set in DS 220, and (b) estimating, or calculating the resulting accuracy of the partially trained model the on a validation set in DS 220.

According to some embodiments, capacity predictor 140 may implement a data-dependent progressive capacity prediction function 140C that may use a lossy compression function to approximate the given dataset DS 220 at progressively decreasing compression rates. These progressively decreasing compression rates may correspond to increasing data instance sizes, and consequently correspond to increasing levels of capacity prediction precision. According to some embodiments, the lossy compression function may for example be, or include the Gonzales compression algorithm as known in the art. However, it may be appreciated that other appropriate compression algorithms may also be considered.

As known in the art, the Gonzales compression algorithm may be used to efficiently obtain a 2-approximation solution to the k-center clustering problem. This means that the Gonzales algorithm can efficiently calculate a cluster whose error is at most a factor two of the optimal clustering whose exact calculation is intractable.

As elaborated herein, pretrained reference NN model M0 may be considered in a functional form, and may be decomposed to a feature generator function and a predictor function, thus obtaining the representation of equation Eq. 7, below:

$$M0(x) = P(F(x))$$

Eq. 7 where x is an input data instance;

F represents the feature generation portion of the M0 model, as elaborated herein e.g., in reference to FIG. 3; and P represents the prediction component of the M0 model as elaborated herein e.g., in reference to FIG. 3.

The vector $F(x) \in R^s$ (where 's' stands for the size of reference model M0, and R represents the Real numbers space) may be referred to herein as the "embedding vector"

corresponding to input x, as known in the art. For example, in classification networks, F(x) can be taken as the value of all neural nodes, of all the layers included in the NN model, starting from the input layer until (and including) the second last layer (e.g., the layer preceding the output layer).

Let DM be a metric of distances, satisfying the triangle inequality, and defined by equation Eq. 8 below:

$$R^s \times R^s \to R^+ \qquad \text{Eq. 8}$$

Where $R^s$ is a vector of real numbers of the size s; and $R^+$ is the non-negative, real number space.

For example, distance metric DM may be a Euclidean norm (e.g., DM $(u, v) = \|u-v\|$). According to some embodiments, metric DM may be extended to measure distances between a vector x and a set of vectors SV as in equation Eq. 9 below:

$$DM(x, SV) = \min DM \ (x, u) \qquad \text{Eq. 9}$$

where u is a vector, $u \in$ SV.

According to some embodiments, capacity predictor 140 may compress dataset DS 220 which may include m instances by: (a) calculating, for each input vector data instance x ($x \in$ DS) its corresponding embedding representation F(x); and (b) computing DS'(k), a compressed version of DS containing k instances.

Capacity predictor 140 may perform step (b) of computing DS'(k) (e.g., perform the Gonzales compression algorithm) according to the following process:

Capacity predictor 140 may chose a first instance of DS' uniformly at random from DS, and may inductively assume that DS'(k) already includes r<k points or data instances.

Capacity predictor 140 may select a subsequent, r+1 point or data instance (e.g., x(r+1)) to maximize the embedding distance to any point or data instance that already resides in DS'(k). In other words, point x(r+1) may be selected according to equation Eq. 10, below:

$$x(r + 1) = \text{argmax}_{x \in DS} DM(F(x), \ F(DS'(k))) \qquad \text{Eq. 10}$$

where F(DS'(k)) is the set of embedding vectors of the data instances in DS'(k)

According to some embodiments, capacity predictor 140 may terminate the construction of DS'(k) after k steps, and may add data instances to DS'(k) together with their corresponding labels from DS 220. This way DS'(k) may be constructed to summarize the dataset DS 220 in the sense that no instance in DS will be too far apart, as measured in the embedding space F(x) by the distance metric DM, from a selected representative in DS'(k).

According to some embodiments, capacity predictor 140 may construct a progressive data-dependent capacity prediction 140C function f(A,RES,DS) by: (a) applying the Gonzales method as explained above, to build a plurality of compressed approximations for DS (e.g., a plurality of DS'), with monotonically increasing sizes; (b) using one of these approximations, corresponding to a specific RES index, for each stage of the progressive capacity prediction 140C process, to collaborate with training module 170, and train, or partially train architectures A for a predefined number of epochs; and (c) ranking the trained or partially train architectures (e.g., the corresponding models) based on the validation data set in DS 220, by measuring their accuracy metric values.

According to some embodiments, capacity predictor 140 may use a monotone sequence of a plurality T integers, k1<k2<<kT (e.g., 200, 400, 600, . . . , 2000), and may use reference model M0 210 and the Gonzales compression algorithm as explained herein to construct a corresponding plurality of T compressed approximations or versions of DS 220. These compressed approximations of DS 220 may be denoted herein as {DS'(k(1)), DS'(k(2)), DS'(k(3)), . . . , DS'(k(T))}. Thus, for integers (i, j), where i<j, the capacity prediction function 140C of architectures over j (e.g., DS' (k(j))) may require more time (e.g., slower training cycles) than the capacity prediction over i (e.g., DS'(k(i))), but may nevertheless produce more accurate estimation results. Capacity predictor 140 may utilize the progressive capacity prediction function 140C f(A, RES, DS) to train at least one architecture A (or corresponding model M) on the approximated dataset DS'(RES), where RES≤T.

According to some embodiments of the invention, search module 120 may collaborate with capacity predictor 140 to improve or expediate the search for optimal architecture A* by utilizing a progressive, data dependent capacity prediction function 140C f(A, RES, DS), where {1≤RES≤T}. Search module 120 may expedite each iteration of the search process by running the progressive estimator with increasing resources, on diminishing subsets of architectures.

In other words, each iterative step of accuracy metric estimation of the current group $G_i$ may include eliminating or omitting a portion (e.g., a predefined percentage) of the NN architectures of the current group $G_i$, according to the estimated accuracy metric values 141, until a subset $K_2$ of the NN architectures of the current group $G_i$ is obtained.

While a low-resource estimator such as f(A,1,DS) (e.g., RES=1) may not be accurate, it can still be used to eliminate one or more lowest capacity architectures.

For example, as elaborated herein, during an iteration i of the multiplication search 121A algorithm, where the PIF (e.g., speedup factor) may be set to $PIF_i$, the subset $G_i$ of NN architectures corresponding to the relevant group of architecture space AS 240 (or sorted architecture space AS' 240') may be according to equation 4', as revisited below:

$$N = G(i) = \{A | (PIF_i - \varepsilon) \le PIF(A) \le (PIF_i + \varepsilon)\} \qquad \text{Eq. 4}$$

where integer number N may represent the size of $G_i$, or the number of architectures included in that subset.

Capacity predictor 140 may perform or apply a progressive capacity prediction function 140C on the current subset, or group $G_i$.

In a first round or iteration of the progressive capacity prediction 140C, capacity predictor 140 may apply progressive capacity prediction function 140C f(A, 1, DS), (e.g., utilizing the least amount of computing resources) on subset $G_i$. For example, in this first round, capacity predictor 140 may use the most compressed version of DS 220 to train the architectures of $G_i$, and obtain therefrom the quickest estimation of the architectures' accuracy metric values. Search module 120 may collaborate with capacity predictor 140, and may omit or eliminate a portion (e.g., N/2) of the architectures (e.g., based on a predetermined elimination factor such as 2), that correspond to the lowest estimated accuracy metric values. In a subsequent round, capacity predictor 140 may apply progressive capacity prediction function 140C f(A, 2, DS), and may use the second most compressed version of DS 220 to train the remaining architectures of G$_i$. Capacity predictor 140 may obtain therefrom the quickest estimation of the remaining architectures' accuracy metric values, and search module 120 may omit a portion (e.g., N/4) of the architectures, that correspond to the lowest estimated accuracy metric values, and so forth.

Thus, in each round of the progressive capacity prediction 140C of architectures of subset SUB$_i$, capacity predictor 140 may increase (e.g., double) the resources provided for training the architectures, and diminish (e.g., halve) the number of candidate architectures. Therefore, within a number of rounds in the order of O(log 2 N), capacity predictor 140 will end up with a small number k (e.g., k=10) architectures, over which capacity predictor 140 may apply the most powerful capacity predictor 140 (e.g., f(A, T, DS)). It may be appreciated that the elimination factor in the above example is 2, but embodiments of the invention may be adapted to use any other elimination factor.

For example, consider a condition where (a) the size of subset G$_i$ is N=1024, (b) the remaining group of most accurate architectures k is 10, and (c) the runtime of capacity prediction function f(A, n, DS) is nC, where C is for example, the number of seconds it takes to run the least accurate estimator (e.g., the runtime of the estimator grows linearly with n). In this condition, the overall runtime of the progressive capacity prediction 140C function will be less than:

$$\sum_{j=0}^{7} \left(\frac{1024}{2^j}\right) 2^j * c = 8 * 1024C$$

In contrast, running the most powerful estimator in this progression (e.g., f(A, $2^7$, DS) on the entire subset G$_i$ once, will consume runtime of $2^7*1024$ C=128·1024C. In other words, in this non-limiting example, embodiments of the invention may have provided a speedup factor of 16x.

Reference is now made to FIG. 6, which is a flow diagram, depicting a method of performing optimization of inference of neural networks by at least one processor (e.g., processor 110 of FIG. 2), according to some embodiments.

As shown in step S1005, processor 110 may receive a plurality of untrained NN architectures, herein referred to as an architecture space (e.g., AS 240 of FIG. 2). As elaborated herein, the plurality of untrained NN architectures of AS 240 may be capable of performing a predefined NN function (e.g., object detection in an image) on a given computing device (e.g., inference computing device H 40 of FIG. 2), after being trained. For example, the plurality of NN architectures of AS 240 may be trained, using a dataset (e.g., DS 220 of FIG. 2) and a training scheme (e.g., training scheme 230 of FIG. 2) as known in the art, to perform the predefined NN function (e.g., object detection) on incoming data instances (e.g., new image data elements).

As shown in step S1010, processor 110 may receive a reference accuracy metric value (e.g., element 211A of FIG. 2) of a reference NN model M0 (e.g., element 210 of FIG. 2). These reference accuracy metric values may include, for example: accuracy, precision-recall trade-offs such as the F-measure metric, squared loss metrics, mean average precision (mAP) metrics and the like.

As shown in step S1015 processor 110 may collaborate with a performance metric evaluation module (e.g., element 180 of FIG. 2) to evaluate or predict (e.g., element 181A of FIG. 2) a performance parameter value (e.g., a latency metric value) 181A for one or more (e.g., each) NN architecture A of the architecture space 240.

As shown in step S1020, processor 110 may collaborate with a grouping module (e.g., grouping module 130 of FIG. 2) to group or divide the architecture space 240 to a plurality of slices or groups (e.g., elements G(0), G$_1$, G$_2$, G$_3$, G(max), etc. of FIG. 5) based on said evaluated performance metric value 181A (e.g., evaluated latency value 181A).

As shown in step S1025, processor 110 may collaborate with a search module (e.g., element 120 of FIG. 2) to perform a search (e.g., a multiplication or exponential search, and/or a binary search) among the plurality of groups of AS 240, to determine a group of architecture space 240 that includes a subset of NN architecture space 240. The determined group may (a) correspond to an optimal performance metric value 181A (e.g., a minimal evaluated latency), and (b) include at least one NN architecture that maintains an accuracy metric value 141 that is at least equal to the reference accuracy metric value 211A.

For example, estimated performance metric value 181A may be latency metric value. In this case, the determined group may correspond to a minimal latency, or a maximal speedup factor G*. The determined group may also be denoted herein as group G*, and may include at least one NN architecture for which estimated accuracy metric value 141 is at least equal to reference accuracy metric value 211A.

As shown in step S1030, processor 110 may collaborate with a training module (e.g., element 170 of FIG. 2) to train at least one NN architecture of the determined group G*. Processor 110 may then emit the at least one NN architecture to perform the NN function. For example, processor 110 may utilize the trained at least one NN architecture (e.g., now a trained NN model) to infer the underlying NN function on an inference computing device H 40.

Reference is now made to FIG. 7, which is a flow diagram, depicting a method of optimizing inference (e.g., runtime optimization) of NNs by at least one processor (e.g., processor 110 of FIG. 2), according to some embodiments.

As shown in steps S2005 and S2010, processor 110 may receive an architecture space 240 representing a plurality of untrained NN architectures. Processor 110 may collaborate with a performance metric evaluation module (e.g., element 180 of FIG. 2) to compute or predict a performance parameter value (e.g., element 181A of FIG. 2) for one or more NN architectures of the plurality of NN architectures as elaborated herein (e.g., in relation to steps S1005, S1015 of FIG. 6).

As shown in step S2015, processor 110 may divide the architecture space to a plurality of groups Gi, based on the computed performance parameter value as elaborated herein (e.g., in relation to step S1020 of FIG. 6).

As shown in step S2020, processor 110 may, for at least one (e.g., each) NN architecture of one or more (e.g., each) groups Gi, collaborate with a capacity predictor (e.g., capacity predictor 140 of FIG. 2) to predict at least one respective value of an inference accuracy metric, as elaborated herein.

As shown in step S2020, processor 110 may subsequently perform a search among the NN architectures of architecture space 240, to select an optimal NN architecture A* of the plurality of NN architectures. As elaborated herein, selection of the optimal NN architecture A* may be based on (a) the division of the architecture space to groups Gi and (b) the at least one predicted value of inference accuracy metric.

As elaborated herein, system 100 may optimize inference of NN models by selecting a NN architecture that is optimized in a sense that it has the best performance parameter value 181A, and yet maintains at least a benchmark accuracy metric value of a reference architecture.

For example, processor 110 may receive a benchmark value 211A of an inference accuracy metric, and perform a search (e.g., multiplication search, and/or binary search) among the plurality of architecture groups Gi, to determine a group G*. As elaborated herein, group G* may be referred to as an optimal group, in a sense that defined that it (a) corresponds to an optimal value (e.g., maximal throughput, minimal latency, etc.) of the performance parameter, and (b) may include one or more NN architectures that correspond to a predicted inference accuracy metric value that is at least equal to the benchmark value 211A. Processor 110 may subsequently select at least one NN architecture from group G* as optimal NN architecture A*.

Additionally, or alternatively, system 100 may optimize inference of NN models by selecting a NN architecture that is optimized in a sense that it has the best accuracy metric value, and yet maintains at least a benchmark performance parameter value 211B of a reference architecture A0.

For example, processor 110 may receive a benchmark value of a performance parameter 211B, and selecting a group G* that corresponds to the performance parameter benchmark value. In other words, group G* may correspond to a range of performance parameter values that includes benchmark performance parameter 211B. Processor 110 may then select an NN architecture of group G*, corresponding to a top-ranking predicted inference accuracy metric value as the optimal NN architecture A*.

As elaborated herein, processor 110 may select the at least one NN architecture from group G* as optimal NN architecture A*, based on capacity prediction (e.g., the estimated accuracy metric value 141). Additionally, or alternatively, processor 110 may select the at least one optimal NN architecture A* based on a combination of estimated accuracy metric value 141 and measured accuracy during inference.

For example, processor 110 may train a subset of top-ranking NN architectures of group G*, corresponding to top-ranking predicted inference accuracy metric values 141. For one or more (e.g., each) NN architecture of the subset, processor 110 may infer, or apply the subset of NN architectures of group G* on a dataset that may include annotated input samples, to measure accuracy metric values 141, according to the annotated input samples, as known in the art. Processor 110 may subsequently select the at least one optimal NN architecture A* according to the measured accuracy metric values. In other words, processor 110 may select the NN architecture A that was measured as most accurate during the inference stage.

Reference is now made to FIG. 8, which is a flow diagram, depicting a method of optimizing inference (e.g., runtime optimization) of NNs by at least one processor (e.g., processor 110 of FIG. 2), according to some embodiments.

As shown in steps S3005, S3010 and S3015, and elaborated herein (e.g., in relation to steps S1005-S1015 of FIG. 6) processor 110 may: receive a space of untrained NN architectures, wherein said architectures are capable, upon training, to perform a predefined NN function on a given computing device; receive a benchmark performance parameter value; and evaluate a performance parameter value for one or more NN architecture of the architecture space.

As shown in step S3020, based on said evaluation, processor 110 may identify a group G* of NN architectures of the architecture space having a performance parameter value that is within a predefined range (e.g., F) of the benchmark performance parameter value.

As shown in steps S3025 and S3030, for a subset (e.g., all) of NN architectures of the identified group G*, processor 110 may collaborate with, or employ a capacity predictor 140, to estimate, or predict an accuracy metric value 141 and may select at least one NN architecture of the subset of NN architectures, based on the predicted accuracy metric values.

As shown in steps S3035 processor 110 may collaborate with, or employ a training module 170, to train the selected at least one NN architecture A*, to perform the NN function. In a subsequent inference stage, processor 110 may apply trained NN architecture A* (now ML model M*) on one or more input data instances, to perform the underlying ML function.

Embodiments of the invention may provide a practical application of automatically selecting an optimal NN architecture among a large (e.g., in the order of millions) plurality of NN architectures.

Embodiments of the invention may include a plurality of improvements over currently available methods and systems for optimization of NN runtime inference.

For example, embodiments of the invention may employ a global search among groups of the architecture space, that includes (a) a multiplication search algorithm and (b) a binary search algorithm over a space of NN architectures, to produce a globally optimal NN architecture for training and inference. It may be appreciated that such a search process may not be prone to falling into a locally optimal solution, as commonly occurs in currently available systems.

Embodiments of the invention may employ fast capacity prediction within each group that is considered during the search process, and may thus avoid unnecessary consumption of processing resources by training inferior NN architectures.

Embodiments of the invention may employ progressive capacity prediction, as elaborated herein, to gradually estimate one or more accuracy metric values, using gradually increasing resources (e.g., training dataset size, computing resources, etc.). This approach has been experimentally demonstrated to boost efficiency of the search for an optimal NN architecture A* within a group of architectures.

Additionally, embodiments of the invention may combine progressive capacity prediction and geometric elimination, as elaborated herein to efficiently omit NN architectures from the search process, while using minimal computation resources.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system for optimizing runtime of a neural network (NN), the system comprising at least one processor configured to execute modules of instruction code, whereupon execution of said modules of instruction code, the at least one processor is configured to:

obtain an architecture space of untrained NN architectures, wherein said architectures are capable, upon training, to perform a predefined NN function on a given computing device H;

employ a performance estimator module to evaluate a performance parameter value for NN architectures of the architecture space;

divide the architecture space to a plurality of groups $G_i$ based on said evaluated performance parameter value;

for at least one group $G_i$, perform an iterative accuracy prediction process on NN architectures of that group, wherein each iteration comprises: (i) employing a resource allocation module to communicate with computing device H to progressively increase allocation of computation resources of the computing device H (ii) employing a training module to partially train NN architectures of that group based on the allocation, and (iii) using a capacity prediction function f( ), to predict an accuracy metric value;

employ a search module to search among the plurality of groups, to determine a group G* that (a) corresponds to an optimal evaluated performance parameter value, and (b) comprises at least one NN architecture that maintains an accuracy metric value that is at least equal to a reference accuracy metric value;

employ the training module to train at least one NN architecture of the determined group G* to perform the NN function; and during an inference stage, employ the computing device H to apply the at least one trained architecture on an instance of input data, thereby performing the NN function, wherein said search comprises: (i) an iterative multiplication search, among the plurality of groups $G_i$, to determine a limit group $G_L$; and (ii) an iterative binary search, among a subset of groups limited by group $G_L$, to determine group G*.

2. The system of claim 1, wherein the at least one processor is further configured to:

predict an accuracy metric value of NN architectures within the determined group G*;

train a predefined $K_1$ number of NN architectures of the determined group G*, corresponding to top valued accuracy metrics;

measure an accuracy metric value of the $K_1$ trained NN architectures; and select a NN architecture having a highest measured accuracy to perform the predefined NN function.

3. The system of claim 1, wherein each iteration of the iterative multiplication search (a) relates to a current group $G_i$, corresponding to a unique range of a performance improvement factor (PIF) $PIF_i$, representing improvement of performance in relation a benchmark performance parameter value, and (b) comprises:

predicting the accuracy metric value of one or more NN architectures within the current group $G_i$;

if at least one accuracy metric value is at least equal to the reference accuracy value, then moving to a next group $G_{i+1}$ that corresponds $PIF_{i+1}$, where $PIF_{i+1}$ is a product of multiplication of $PIF_i$ by a predetermined multiplication factor; and determining the first group which does not comprise a NN architecture that maintains an accuracy metric value that is at least equal to the reference accuracy metric value as the limit group $G_L$.

4. The system of claim 1, wherein each iteration of the iterative binary search (a) relates to a current group $G_i$, corresponding to a unique range of PIF, $PIF_i$, representing improvement of performance in relation a benchmark performance parameter value, and (b) comprises:

predicting the accuracy metric value of one or more NN architectures within the current group $G_i$;

if at least one accuracy value is at least equal to the reference accuracy value, then moving to a next group $G_{i+1}$ that corresponds to a $PIF_{i+1}$, where $PIF_{i+1}=2*PIF_i$; and if no accuracy value is at least equal to the reference accuracy value, then moving to a next group $G_{i+1}$ that corresponds to a $PIF_{i+1}$, where $PIF_{i+1}=PIF_i/2$.

5. The system of claim 3, wherein predicting the accuracy metric value comprises employing a capacity prediction function f( ), adapted to compare accuracy of untrained or partially trained NN architectures, such that for each two NN architectures $A_1$ and $A_2$, if an accuracy metric value of $A_1$ is bigger than an accuracy metric value of $A_2$, then $f(A_1)$ is bigger than $f(A_2)$.

6. The system of claim 5, wherein predicting the accuracy metric values of NN architectures of the current group $G_i$ is performed iteratively, wherein each iteration of the accuracy metric prediction employs progressively increasing computation resources of the at least one processor.

7. The system of claim 6, wherein each iteration of the accuracy metric prediction of NN architectures of the current group $G_i$ comprises eliminating a portion of the NN architectures of the current group, according to the predicted accuracy metric values, until a subset $K_2$ of the NN architectures of the current group $G_i$ is obtained.

8. The system of claim 7, wherein $K_2$ is selected from a list consisting of: a predefined percentage of the NN architectures of the current group $G_i$, and a predefined number of NN architectures in the current group $G_i$.

9. The system of claim 1, wherein the performance parameter value is selected from a list consisting of latency of the NN architecture, throughput of the NN architecture, power consumption of a computing device for executing the NN architecture, memory consumption of the NN architecture on the computing device, and processing cycles consumed by the computing device for executing the NN architecture.

10. The system of claim 9, wherein evaluating a latency performance parameter value of a NN architecture comprises:

feeding the evaluated NN architecture with random inputs;

sampling a number of forward path computations of the untrained architecture on the given computing device;

measuring the latency for each forward path computation; and averaging the resulting latencies, to produce an evaluated latency value of the NN architecture.

11. The system of claim 1, wherein evaluating a performance parameter value of a NN architecture comprises:

providing as a first input, one or more structural data elements, representing a structure of the NN architecture to a machine learning (NIL) based model, trained to evaluate a performance parameter value of the NN architecture based on the first input; and obtaining from the ML-based model a predicted evalua-
tion of the NN architecture performance parameter
value based on the first input.

12. The system of claim 11, wherein the at least one
processor is further configured to:

provide as a second input, one or more computing device
parameters, representing characteristics of a computing
device, to the ML-based model; and obtain from the ML-based model a predicted evaluation
of the NN architecture performance parameter value,
based on the first input and the second input.

13. The system of claim 11, wherein training the ML-
based model comprises:

receiving, by the at least one processor, one or more
annotated performance data elements, that comprise
ground truth information pertaining to at least one
performance parameter value of a NN architecture; and training the ML-based model to predict performance
metric values for incoming NN architectures, based on
a training dataset comprising the annotated perfor-
mance data elements.

14. The system of claim 13, wherein the ML-based model
is an active learning model, and wherein training the ML-
based model further comprises:

emitting, by the ML-based model, a request to provide
annotated performance data elements that correspond
to one or more specific NN architecture; and receiving, by the at least one processor, one or more
annotated performance data elements, according to the
request.

15. A method of optimizing inference of a neural network
(NN) on a given computing device H, the method compris-
ing:

obtaining an architecture space representing a plurality of
untrained NN architectures;

for one or more NN architectures of the plurality of NN
architectures, computing a value of a performance
parameter;

dividing the architecture space to a plurality of groups Gi,
based on the computed performance parameter value;

for at least one group $G_i$, performing an iterative accuracy
prediction process on NN architectures of that group,
wherein each iteration comprises (i) communicating
with computing device H to progressively increase
allocation of computation resources of the computing
device H, (ii) partially train NN architectures of that
group based on the allocation, and (iii) predicting a
value of an inference accuracy metric, using a progres-
sive capacity prediction function fusing the progres-
sively increasing computational resources of comput-
ing device H;

selecting an optimal NN architecture A* of the plurality of
NN architectures based on (a) the division of the
architecture space to groups $G_i$ and (b) the at least one
predicted value of inference accuracy metric, wherein
said selection comprises: performing an iterative search
among the plurality of groups Gi, to determine a group
G* that (a) corresponds to an optimal performance
parameter value, and (b) comprises at least one NN
architecture that maintains an accuracy metric value
that is at least equal to a reference accuracy metric
value, and wherein said iterative search comprises: (i)

an iterative multiplication search, among the plurality
of groups $G_i$, to determine a limit group $G_L$; and (ii) an
iterative binary search, among a subset of groups
limited by group $G_L$, to determine group G*; and applying, during an inference stage, the trained optimal
NN architecture A* to perform the NN function on
instances of input data samples.

16. The method of claim 15, wherein the NN architectures
of the architecture space are: (a) distinguished by at least one
structural data element, and (b) are defined as being capable
of performing a predetermined NN function after training.

17. The method of claim 16, further comprising:

training the optimal NN architecture A* to perform the
NN function; and during an inference stage, applying optimal NN architec-
ture A* to perform the NN function on instances of
input data samples.

18. The method of claim 15, wherein selecting an optimal
NN architecture A* comprises:

receiving a benchmark value of an inference accuracy
metric;

performing a search among the plurality of architecture
groups Gi, to determine a group G* that (a) corresponds
to an optimal value of the performance parameter, and
(b) comprises one or more NN architectures that cor-
respond to a predicted inference accuracy metric value
that is at least equal to the benchmark value; and selecting at least one NN architecture from group G* as
optimal NN architecture A*.

19. The method of claim 18, wherein selecting at least one
NN architecture from group G* as optimal NN architecture
A* comprises:

training a subset of top-ranking NN architectures of group
G*, corresponding to top-ranking predicted inference
accuracy metric values;

inferring the subset of NN architectures of group G* on a
dataset comprising annotated input samples;

measuring the accuracy metric values according to the
annotated input samples; and selecting optimal NN architecture A* according to the
measured accuracy metric values.

20. The method of claim 15, wherein selecting an optimal
NN architecture A* comprises:

receiving a benchmark value of a performance parameter;

selecting a group G* that corresponds to the performance
parameter benchmark value; and selecting an NN architecture of group G*, corresponding
to a top-ranking predicted inference accuracy metric
value as the optimal NN architecture A*.

21. The method of claim 20, wherein selecting a top-
ranking NN architecture of group G* comprises:

training a subset of top-ranking NN architectures of group
G*, corresponding to top-ranking predicted inference
accuracy metric values;

inferring the subset of NN architectures of group G* on a
dataset comprising annotated input samples;

for each NN architecture of the subset, measuring the
accuracy metric value according to the annotated input
samples; and selecting the optimal NN architecture A* according to the
measured accuracy metric values.

* * * * *